(12) United States Patent
Tomura et al.

(10) Patent No.: US 8,574,788 B2
(45) Date of Patent: Nov. 5, 2013

(54) FUEL CELL SYSTEM INCLUDING GAS EXHAUST AND WATER FLOW PATHS AND INSULATOR

(75) Inventors: Takanao Tomura, Nishio (JP); Hironori Noto, Tokai (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 223 days.

(21) Appl. No.: 13/264,108

(22) PCT Filed: Apr. 12, 2010

(86) PCT No.: PCT/JP2010/002644
§ 371 (c)(1),
(2), (4) Date: Oct. 12, 2011

(87) PCT Pub. No.: WO2010/119658
PCT Pub. Date: Oct. 21, 2010

(65) Prior Publication Data
US 2012/0040259 A1   Feb. 16, 2012

(30) Foreign Application Priority Data

Apr. 15, 2009   (JP) ................... 2009-098541

(51) Int. Cl.
*H01M 8/04* (2006.01)
(52) U.S. Cl.
USPC ............................ 429/512; 429/516; 429/514
(58) Field of Classification Search
USPC ........................................ 429/512, 516, 414
See application file for complete search history.

(56) References Cited

U.S. PATENT DOCUMENTS

| | | | |
|---|---|---|---|
| 2004/0202911 A1 | 10/2004 | Komura et al. | |
| 2007/0111083 A1* | 5/2007 | Kikuchi et al. | 429/38 |

FOREIGN PATENT DOCUMENTS

| | | |
|---|---|---|
| JP | 11-111316 A | 4/1999 |
| JP | 2001-118596 A | 4/2001 |
| JP | 2001-266925 A | 9/2001 |
| JP | 2004-139817 A | 5/2004 |
| JP | 2005-116499 A | 4/2005 |
| JP | 2005-259422 A | 9/2005 |
| JP | 2006-147503 A | 6/2006 |
| JP | 2007-042538 A | 2/2007 |
| JP | 2007042538 A * | 2/2007 |
| JP | 2009-009716 A | 1/2009 |

* cited by examiner

*Primary Examiner* — Zachary Best
(74) *Attorney, Agent, or Firm* — Sughrue Mion, PLLC

(57) ABSTRACT

A fuel cell system includes: a gas exhaust flow path extended in a stacking direction of laminates and configured to have one end located inside a fuel cell stack and the other end located outside the fuel cell stack; and a water discharge flow path provided at a lower position than the gas exhaust flow path and formed to pass through at least part of the laminates. The gas exhaust flow path is interconnected with the water discharge flow path via at least one connecting section in the fuel cell stack. The gas exhaust flow path includes a narrowed flow path having the smaller sectional area than the sectional area of an adjacent flow path in downstream of the connecting section. The water discharge flow path has a downstream end connecting with the narrowed flow path.

6 Claims, 20 Drawing Sheets

FUEL CELL SYSTEM INCLUDING GAS EXHAUST AND WATER FLOW PATHS AND INSULATOR

Cross Reference To Related Applications

This application is a National Stage of International Application No. PCT/JP2010/002644 filed Apr. 12, 2010, claiming priority based on Japanese Patent Application No. 2009-098541 filed Apr. 15, 2009, the contents of all of which are incorporated herein by reference in their entirety.

TECHNICAL FIELD

The present invention relates to a fuel cell system.

BACKGROUND ART

There are known techniques to locate porous water suction pipes for water discharge in connection holes (also called "manifolds"), in order to remove reaction product water produced by electrode reactions of fuel cells and water produced by dew condensation or any other reason (hereafter may be simply referred to as "the water") from the connection holes (for example, patent literature 1).

The large amount of produced water may, however, cause difficulty in sufficiently removing the water by means of the porous water suction pipes. The accumulated water may decrease or even block the open area of the connection holes. This may interfere with the smooth flows of reaction gases and lower the power generation performance.

PRIOR ART DOCUMENTS

Patent Literature

Patent Literature 1: JP-A-2001-118596
Patent Literature 2: JP-A-2005-116499
Patent Literature 3: JP-A-2005-259422
Patent Literature 4: JP-A-2006-147503
Patent Literature 5: JP-A-H11-111316

SUMMARY OF THE INVENTION

Technical Problem

It would be needed to provide a technique that reduces the decrease or blockage of connection holes by water.

Solution to Problem

In order to achieve at least part of the foregoing, the present invention provides various aspects and embodiments described below.

A fuel cell system, comprising a fuel cell stack including: a plurality of laminates of membrane electrode assemblies stacked via separators; and a pair of end plates holding the plurality of laminates from both sides, wherein in a stacking direction of the laminates, the fuel cell stack further includes:

a pair of terminal plates respectively located between the plurality of stacked laminates and the pair of end plates; and a pair of insulators respectively located between the pair of terminal plates and the pair of end plates disposed outside the pair of terminal plates, the fuel cell system further comprising:

a gas exhaust flow path for discharging a reaction gas extended in the stacking direction of the laminates and configured to have one end located inside the fuel cell stack and the other end located outside the fuel cell stack; and a water discharge flow path provided at a lower position than the gas exhaust flow path in an installation state of the fuel cell stack and formed to pass through at least part of the laminates, wherein the gas exhaust flow path is interconnected with the water discharge flow path via at least one connecting section in the fuel cell stack, the gas exhaust flow path includes a narrowed flow path having smaller sectional area than sectional area of an adjacent flow path in downstream of the connecting section, the narrowed flow path being formed in a downstream insulator, wherein in a flow direction of the reaction gas flowing in the water discharge flow path, the downstream insulator is located on a downstream side out of the pair of insulators and made of resin, and the water discharge flow path has a downstream end connecting with the narrowed flow path.

[First Aspect]

A fuel cell system, comprising a fuel cell stack including: a plurality of laminates of membrane electrode assemblies stacked via separators; and a pair of end plates holding the plurality of laminates from both sides, the fuel cell system further comprising:

a gas exhaust flow path for discharging a reaction gas extended in a stacking direction of the laminates and configured to have one end located inside the fuel cell stack and the other end located outside the fuel cell stack; and a water discharge flow path provided at a lower position than the gas exhaust flow path in an installation state of the fuel cell stack and formed to pass through at least part of the laminates, wherein the gas exhaust flow path is interconnected with the water discharge flow path via at least one connecting section in the fuel cell stack, the gas exhaust flow path includes a narrowed flow path having smaller sectional area than sectional area of an adjacent flow path in downstream of the connecting section, and the water discharge flow path has a downstream end connecting with the narrowed flow path.

In the fuel cell system according to the first aspect, when the reaction gas passes through the narrowed flow path, the pressure of the reaction gas flowing through the narrowed flow path becomes lower than the pressure of the reaction gas flowing through the gas exhaust flow path other than the narrowed flow path. The water in the water discharge flow path can thus be introduced into the narrowed flow path and led to the downstream with high efficiency. Since the water discharge flow path interconnected with the gas exhaust flow path is disposed at the lower position than the gas exhaust flow path, part of the water present in the gas exhaust flow path flows through the connecting section into the water discharge flow path. This arrangement effectively reduces the decrease or blockage of the gas exhaust flow path located in the fuel cell stack by the water.

[Second Aspect]

The fuel cell system in accordance with the first aspect, wherein the narrowed flow path is formed in the gas exhaust flow path located outside the fuel cell stack.

In the fuel cell system according to the second aspect, the narrowed flow path is formed in the gas exhaust flow path located outside the fuel cell stack and is connected with a downstream end of the water discharge flow path. This arrangement enables the water flowing through the connecting section into the water discharge flow path to be led out of the fuel cell stack with high efficiency, thus reducing the decrease or blockage of the gas exhaust flow path located in the fuel cell stack by the water.

[Third Aspect]

The fuel cell system in accordance with the second aspect, wherein the gas exhaust flow path located outside the fuel cell stack has a flow passage area variable mechanism for varying flow passage area, and the narrowed flow path is formed by the flow passage area variable mechanism.

In the fuel cell system according to the third aspect, the narrowed flow path is readily formed by the flow passage area variable mechanism.

[Fourth Aspect]

The fuel cell system in accordance with the first aspect, wherein the narrowed flow path is formed in the gas exhaust flow path located in the fuel cell stack.

The fuel cell system according to the fourth aspect does not require the water discharge flow path to be extended outside of the fuel cell stack, thus reducing the cost.

[Fifth Aspect]

The fuel cell system in accordance with the fourth aspect, wherein in the stacking direction of the laminates, the fuel cell stack further includes:

a pair of terminal plates respectively located between the plurality of stacked laminates and the pair of end plates; and a pair of insulators respectively located between the pair of terminal plates and the pair of end plates disposed outside the pair of terminal plates, wherein the narrowed flow path is formed in at least one of a downstream end plate, a downstream terminal plate and a downstream insulator located on a downstream side in a flow direction of the reaction gas flowing in the water discharge flow path, out of the pair of end plates, the pair of terminal plates and the pair of insulators located on respective sides of the plurality of stacked laminates.

In the fuel cell system according to the fifth aspect, the narrowed flow path is formed in specific part of the fuel cell stack, which is located in the downstream of the plurality of laminates in the flow direction of the reaction gas flowing through the water discharge flow path. This arrangement enables the water in the water discharge flow path to be smoothly led out of the fuel cell stack.

[Sixth Aspect]

The fuel cell system in accordance with the fifth aspect, wherein the downstream insulator is made of resin, and the narrowed flow path is formed in the downstream insulator.

The fuel cell system according to the sixth aspect allows for easy formation of the narrowed flow path. For example, the downstream insulator including the narrowed flow path may be readily formed by injection molding the resin with a mold for forming the narrowed flow path.

[Seventh Aspect]

The fuel cell system in accordance with any one of the first aspect to the sixth aspect, wherein in the fuel cell stack, flow passage area of the water discharge flow path is smaller than flow passage area of the gas exhaust flow path.

In the fuel cell system according to the seventh aspect, the flow passage area of the water discharge flow path is smaller than the flow passage area of the gas exhaust flow path. This arrangement increases the possibility that the flow of the reaction gas in the water discharge flow path is blocked off by the water. When the flow of the reaction gas is blocked off, the pressure of the reaction gas on the downstream side of the water connecting with the narrowed flow path is lower than the pressure of the reaction gas on the upstream side of the water in the water discharge flow path. Accordingly, the water can be more smoothly moved to the downstream side by the pressure difference.

[Eighth Aspect]

The fuel cell system in accordance with any one of the first aspect to the seventh aspect, wherein the connecting section is formed to interconnect at least an upstream end of the gas exhaust flow path with an upstream end of the water discharge flow path.

When water is present in the upstream ends of the gas exhaust flow path and the water discharge flow path, the fuel cell system according to the eighth aspect enables the water to be smoothly flowed through the connecting section into the water discharge flow path. Even when the fuel cell stack is tilted to make one end (gas upstream side) of the gas exhaust flow path in the fuel cell stack lower in position than the other end (gas downstream side), the water is flowed through the connecting section into the water discharge flow path. This arrangement effectively reduces the decrease or blockage of the gas exhaust flow path located in the fuel cell stack by the water.

[Ninth Aspect]

The fuel cell system in accordance with any one of the first aspect to the seventh aspect, wherein the number of the connecting section is one, and the connecting section is formed to interconnect an upstream end of the gas exhaust. flow path with an upstream end of the water discharge flow path.

In the fuel cell system according to the ninth aspect, the water discharge flow path is riot connected with the gas exhaust flow path between the upstream end and the downstream end connecting with the narrowed flow path. This arrangement lowers the possibility that the flow of the water from the upstream side toward the downstream side in the water discharge flow path is interfered with by the gas flowing through the gas exhaust flow path. This arrangement thus enables the water in the water discharge flow path to be more smoothly moved toward the downstream side, compared with the structure including a plurality of connecting sections between the upstream end and the downstream end along the water discharge flow path.

The present invention may be actualized by diversity of applications, for example, a fuel cell system and a vehicle (moving body) equipped with the fuel cell system.

BRIEF DESCRIPTION OF THE DRAWINGS

FIG. 12 is a partially sectional view showing the neighborhood of a narrowed flow path 251a;

DESCRIPTION OF THE EMBODIMENTS

Figure 1:
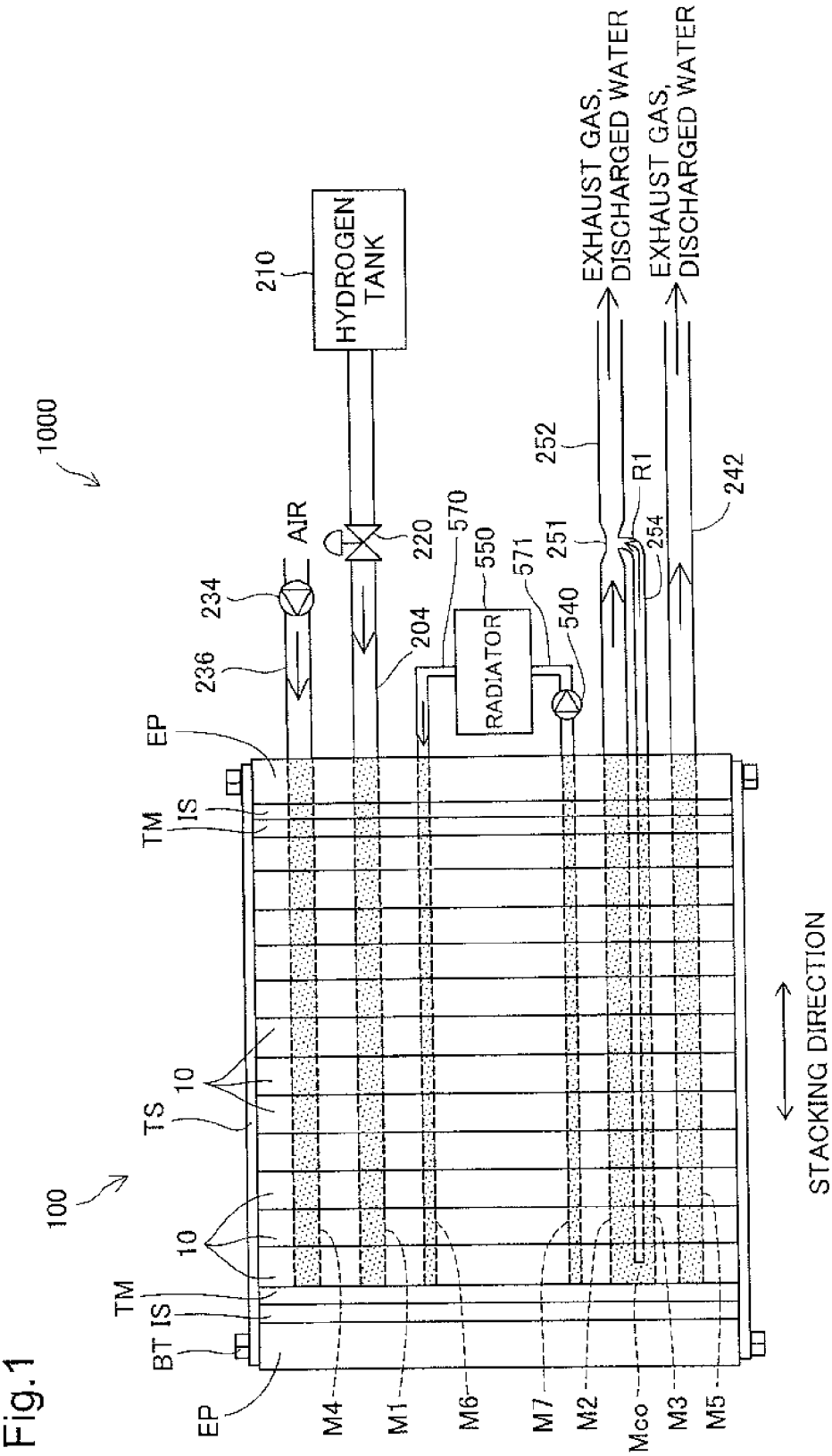
FIG. 1 is an explanatory diagram showing the schematic structure of a fuel cell system 1000 according to a first embodiment of the invention.

Embodiments of the present invention are described in the following sequence:
A. First Embodiment
B. Second Embodiment
C. Third Embodiment
D. Fourth Embodiment
E. Modifications
A. First Embodiment FIG. 1 is an explanatory diagram showing the schematic structure of a fuel cell system 1000 according to a first embodiment of the invention. This fuel cell system 1000 may be mounted on, for example, a vehicle to be used as a power source of the vehicle. The fuel cell system 1000 mainly includes a fuel cell stack 100, a hydrogen tank 210 as a fuel gas supplier, an air pump 234 as an oxidizing gas supplier, and a radiator 550 and a pump 540 as a cooling medium supplier. The fuel cell system 1000 further has pipes 204, 236 and 570 for supplying reaction gases (fuel gas and oxidizing gas) and a cooling medium to the fuel cell stack 100, and pipes 242, 252, 254 and 571 for discharging the reaction gases, water, and the cooling medium from the fuel cell stack 100.

The fuel cell stack 100 of the embodiment uses relatively small-size polymer electrolyte fuel cells having excellent power generation efficiency. The fuel cell stack 100 includes a plurality of laminates 10, end plates EP, tension plates TS, insulators IS and terminal plates TM. Each of the plurality of laminates 10 includes a unit and separators. The unit equips a membrane electrode assembly and a seal gasket integrally. The detailed structure of the laminate 100 will be discussed later. The plurality of laminates 10 are located between the two end plates EP across the insulators IS and the terminal plates TM. In other words, the pair of terminal plates TM, the pair of insulators IS, and the pair of end plates EP are located on both sides of the plurality of laminates 10 in this sequence from inside to outside along the stacking direction of the laminates 10. The tension plates TS are fastened to the respective end plates EP by means of bolts BT.

The terminal plates TM serve as power collector plates to take out electricity generated by power generation assemblies of the laminates 10 (discussed later) via output terminals (not shown). Any of various conductive members may be used for the terminal plates TM. In this embodiment, copper plate members are used as the terminal plates TM. The insulators IS serve to insulate the terminal plates TM from the end plates EP. Any of various insulating members may be used for the insulators IS. In this embodiment, injection-molded glass epoxy resin plates are used as the insulators IS. The end plates EP serve to apply pressure to the plurality of laminates 10 from both ends in the stacking direction. Any of various metal members having corrosion resistance and rigidity may be used for the end plates EP. In this embodiment, stainless steel plates are used as the end plates EP.

The fuel cell stack 100 internally includes a plurality of manifolds M1 to M7 (shown by sand hatching) disposed along the stacking direction of the laminates 10. The manifold M1 is a fuel gas supply manifold for supplying hydrogen gas as the fuel gas, and the manifold M2 is a fuel gas exhaust manifold for discharging the hydrogen gas. The manifold M3 is a water discharge manifold for discharging the reaction product water and the water produced by dew condensation. The water discharge manifold M3 is located at a lower position than the fuel gas exhaust manifold M2 in the state of the fuel cell stack 100 installed in, for example, the vehicle. The manifold M4 is an oxidizing gas supply manifold for supplying the air as the oxidizing gas, and the manifold M5 is an oxidizing gas exhaust manifold for discharging the air. The manifold M6 is a cooling medium supply manifold for supplying the cooling medium, and the manifold M7 is a cooling medium discharge manifold for discharging the cooling medium.

Hydrogen gas is supplied from the hydrogen tank 210 that stores high-pressure hydrogen, through the fuel gas supply pipe 204 to the fuel gas supply manifold M1. The fuel gas supply pipe 204 is equipped with a valve 220 for regulating the supply of hydrogen gas. The hydrogen gas introduced into the fuel cell stack 100 is supplied to anodes of membrane electrode assemblies in the fuel cell stack 100 (discussed later) to be used for power generation by electrochemical reactions. Instead of the supply from the hydrogen tank 210, the hydrogen gas may be generated by a reforming reaction of an alcohol or a hydrocarbon as the material.

The fuel gas exhaust manifold M2 is connected with the fuel gas exhaust pipe 252. The hydrogen gas discharged from the anodes flows through the fuel gas exhaust manifold M2 and the fuel gas exhaust pipe 252 and is released to the atmosphere. The fuel gas exhaust pipe 252 has a narrowed flow path 251 having the smaller flow passage area than the adjacent flow path. The narrowed flow path 251 of this embodiment has a venturi shape. For the smooth discharge of hydrogen gas, it is preferable to design the fuel gas exhaust manifold M2 and the fuel gas exhaust pipe 252 having substantially constant flow passage areas, except the narrowed flow path 251.

The water discharge manifold M3 is connected with the water discharge pipe 254. One end R1 (also called "downstream end R1") of the water discharge pipe 254 is connected with the narrowed flow path 251. A connecting section Mco interconnects respective upstream ends of the fuel gas exhaust manifold M2 and the water discharge manifold M3.

The fuel gas exhaust manifold M2 and the fuel gas exhaust pipe 252 correspond to the gas exhaust flow path described in the claims, and the water discharge manifold M3 and the water discharge pipe 254 correspond to the water discharge flow path described in the claims. The upstream and the downstream are based on the flow direction of a fluid (fuel gas, the air or water) flowing in the object flow path.

The air is supplied from the air pump 234 through the oxidizing gas supply pipe 236 to the oxidizing gas supply manifold M4. The air introduced into the fuel cell stack 100 via the oxidizing gas supply manifold M4 is supplied to cathodes of membrane electrode assemblies in the fuel cell stack 100 (discussed later) to be used for power generation by the electrochemical reactions.

The oxidizing gas exhaust manifold M5 is connected with the oxidizing gas exhaust pipe 242. The air discharged from the cathodes flows through the oxidizing gas exhaust manifold M5 and the oxidizing gas exhaust pipe 242 and is released to the atmosphere. For the smooth discharge of the air, it is preferable to design the oxidizing gas exhaust manifold M5 and the oxidizing gas exhaust pipe 242 having substantially constant flow passage areas.

Cooling water as the cooling medium is supplied from the radiator 550 through the cooling medium supply pipe 570 to the cooling medium supply manifold M6 in the fuel cell stack 100. The cooling medium is not limited to water but may be, for example, an antifreeze fluid, such as ethylene glycol, or the air.

The cooling medium discharge manifold M7 is connected with the cooling medium discharge pipe 571. The cooling water passing through the inside of the fuel cell stack 100 flows through the cooling medium discharge manifold M7 and the cooling medium discharge pipe 571 to the radiator 550 and is supplied again to the fuel cell stack 100. The cooling medium discharge pipe 571 is equipped with a circulation pump 540 for circulation of the cooling water.

The interconnection between the water discharge manifold M3 and the fuel gas exhaust manifold M2 via the connecting section Mco causes part of the water present in the fuel gas exhaust manifold M2 to flow into the water discharge manifold M3 via the connecting section Mco. This arrangement effectively reduces the decrease or blockage of the fuel gas exhaust manifold M2 by the water. The pressure is lowered in the narrowed flow path 251 than in the adjacent fuel gas exhaust pipe 252. In other words, the internal pressure of the narrowed flow path 251 is lower than the pressure in the neighborhood of the connecting section Mco located on the upstream side in the fuel cell stack 100. The water in the water discharge manifold M3 and the water discharge pipe 254 is accordingly flowed through and guided by the narrowed flow path 251 and is discharged out of the fuel cell stack 100 with high efficiency. The connecting section Mco may not be necessarily formed to interconnect the respective upstream ends of the fuel gas exhaust manifold M2 and the water discharge manifold M3, but may be formed at any suitable position in the fuel cell stack 100 to interconnect the fuel gas exhaust manifold M2 and the water discharge manifold M3 at any arbitrary position. There may be a plurality of the connecting sections Mco. The presence of the plurality of connecting sections Mco facilitates the water in the fuel gas exhaust manifold M2 to flow into the water discharge manifold M3 and more effectively reduces the decrease or blockage of the fuel gas exhaust manifold M2 by the accumulated water.

Figure 2:
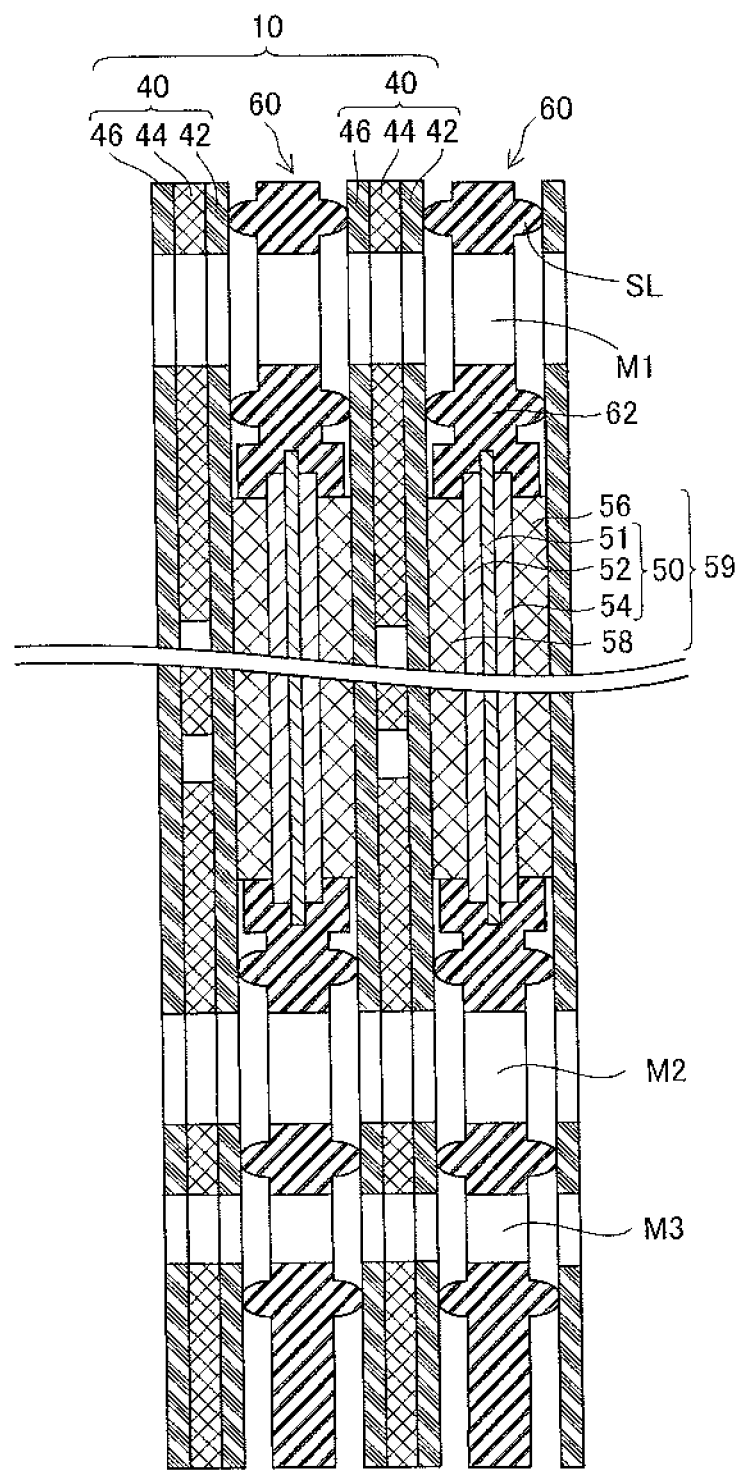
FIG. 2 is an explanatory diagram showing the schematic structure of a laminate 10.

FIG. 2 is an explanatory diagram showing the schematic structure of the laminate 10. The laminate 10 includes a seal-integrated membrane electrode assembly 60 and separators 40 located on both sides of the seal-integrated membrane electrode assembly 60. The seal-integrated membrane electrode assembly 60 includes a membrane electrode assembly 50, gas flow path bodies 56 and 58 formed on both faces of the membrane electrode assembly 50, and a seal gasket 62 provided to surround the periphery of the membrane electrode assembly 50 and the gas flow path bodies 56 and 58. The membrane electrode assembly 50 combined with the gas flow path bodies 56 and 58 is hereafter called MEGA (membrane electrode gas diffusion layer assembly) 59.

The membrane electrode assembly 50 includes an electrolyte membrane 51 and an anode electrode layer 52 and a cathode electrode layer 54 formed on respective faces of the electrolyte membrane 51. The electrolyte membrane 51 is made of a solid polymer electrolyte having proton conductivity. A typical example of such electrolyte is Nafion (registered trademark by du Pont). Each of the two electrode layers 52 and 54 is made of a material having gas permeability and good electrical conductivity (for example, carbon paper) and serves as a gas diffusion layer to diffuse the supplied reaction gas (hydrogen gas or the air) over the whole surface of the electrolyte membrane 51. Catalyst layers (not shown) having a catalyst for accelerating the electrode reactions are formed between the respective electrode layers 52 and 54 and the electrolyte membrane 51. The catalyst may be, for example, platinum (Pt). The cathode gas flow path body 56 and the anode gas flow path body 58 serve as gas flow paths to distribute the respective reaction gases over the whole surfaces of the corresponding electrode layers 52 and 54. The gas flow path bodies 56 and 58 are made of a material having electrical conductivity, such as carbon or a sintered metal.

The seal gasket 62 is made of an insulating resin material having elasticity, for example, silicone rubber, butyl rubber or fluoro-rubber and is formed around the periphery of the MEGA 59 by injection molding. The seal gasket 62 has projections in the thickness direction, which come into contact with the adjacent separators 40 located on the respective sides of the seal gasket 62 and are deformed by a preset fastening force in the stacking direction. The projections accordingly form seal lines SL to prevent leakage of the fluids flowing through the manifolds M1 to M7 (reaction gases, cooling water, and the water). In the illustrated state of FIG. 2, the hydrogen gas and the water flowing through the manifolds M1, M2 and M3 are sealed by the seal lines SL.

The separator 40 is formed in a layered structure of three thin metal plates. The thin metal plates may be made of a metal material, such as titanium, titanium alloy or stainless steel. More specifically, the separator 40 includes an anode plate 42 that comes into contact with the anode gas flow path body 58, a cathode plate 46 that comes into contact with the cathode gas flow path body 56, and a middle plate 44 located between the anode plate 42 and the cathode plate 46 to mainly form the flow path of the cooling water. The detailed structures of the respective plates 42, 44 and 46 will be described later.

Figure 3:
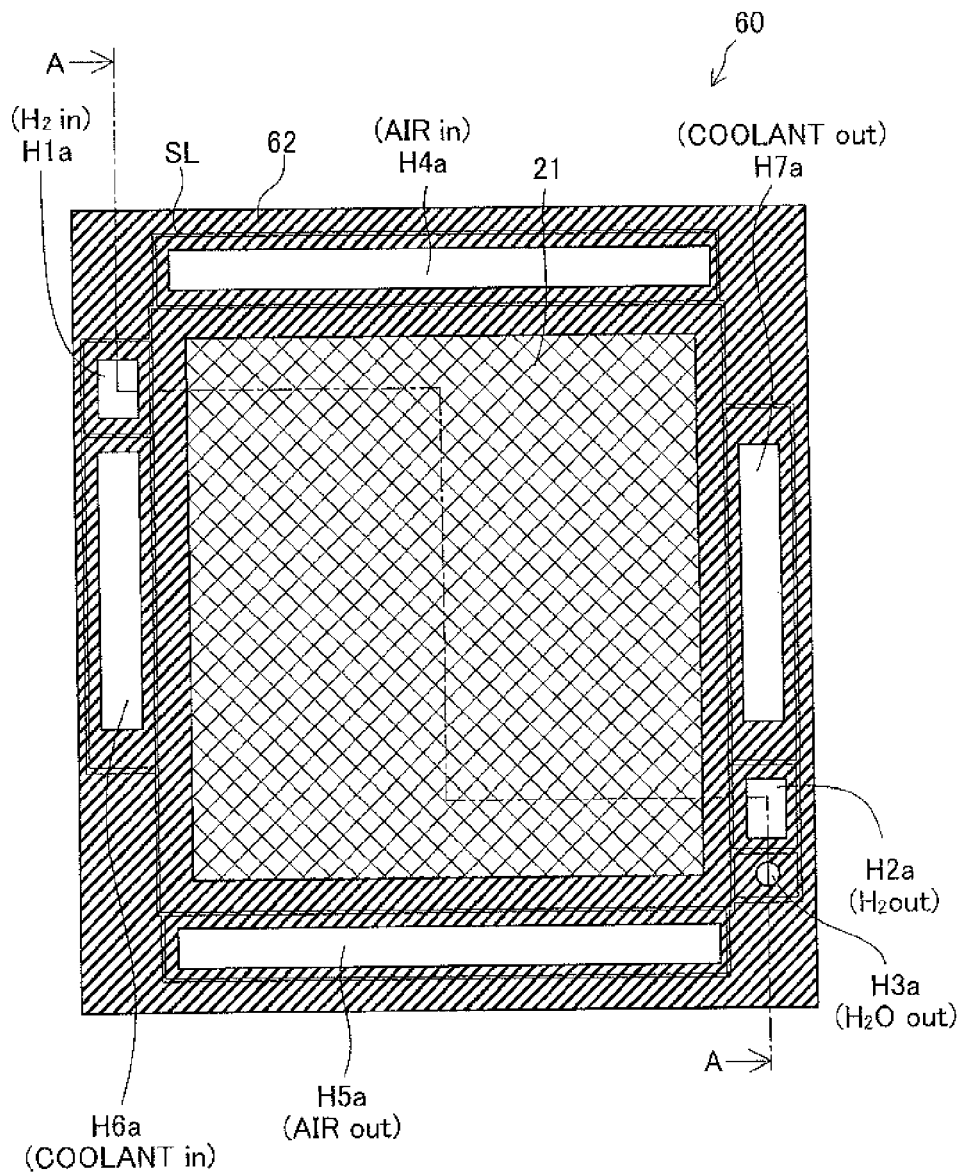
FIG. 3 is an explanatory diagram showing the structure of a seal-integrated membrane electrode assembly 60.

FIG. 3 is an explanatory diagram showing the structure of the seal-integrated membrane electrode assembly 60. FIG. 3 shows an anode-side face of the seal-integrated membrane electrode assembly 60, seen from the stacking direction of the laminates 10. In the state of the fuel cell stack 100 installed on a moving body, such as a vehicle, the up-down direction of FIG. 3 represents the vertical direction, and the down direction represents the vertically downward direction. A cathode-side face of the seal-integrated membrane electrode 60 has the similar structure to that of the anode-side face and is not specifically illustrated.

The seal-integrated membrane electrode assembly 60 has an approximate rectangular profile and includes a power generation assembly 21 in a center area. The seal gasket 62 provided around the periphery of the power generation assembly 21 has a plurality of through holes H1a to H7a. These through holes H1a to H7a form parts of the respective manifolds M1 to M7 (FIG. 1) in the stack of the laminates 10. The hydrogen gas supplied via the fuel gas supply pipe 204 passes through the through hole H1a, and the hydrogen gas discharged from the anode passes through the through hole H2a. Water GW flowing into the water discharge manifold M3 passes through the through hole H3a. The air supplied from the air pump 234 via the oxidizing gas supply pipe 236 passes through the through hole H4a, and the air discharged from the cathode passes through the through hole H5a. The cooling water supplied from the radiator 550 via the cooling medium supply pipe 570 passes through the through hole H6a, and the cooling water used for cooling passes through the through hole H7a.

The through hole H1a and the through hole H2a are respectively formed at the upper left position and at the lower right position in the seal gasket 62. The through hole H3a is formed at the lower position than the through hole H2a. In other words, the through hole H3a is located at the lower position than the through hole H2a in the state of the seal-integrated membrane electrode assembly 60 mounted as part of the fuel cell stack 100 on, for example, the vehicle. The through hole H3a has the smaller opening area than the through hole H2a. The through hole H4a is formed along the upper side of the seal gasket 62, and the through hole H5a is formed along the lower side of the seal gasket 62. The through hole H6a is formed along the left side of the seal gasket 62, and the through hole H7a is formed along the right side of the seal gasket 62. The through holes H1a to H7a are not limited to the illustrated shapes and layout but may be formed in any of other various shapes and layouts. In any case, it is preferable to locate the through hole H3a at the lower position than the through hole H2a.

Figure 4:
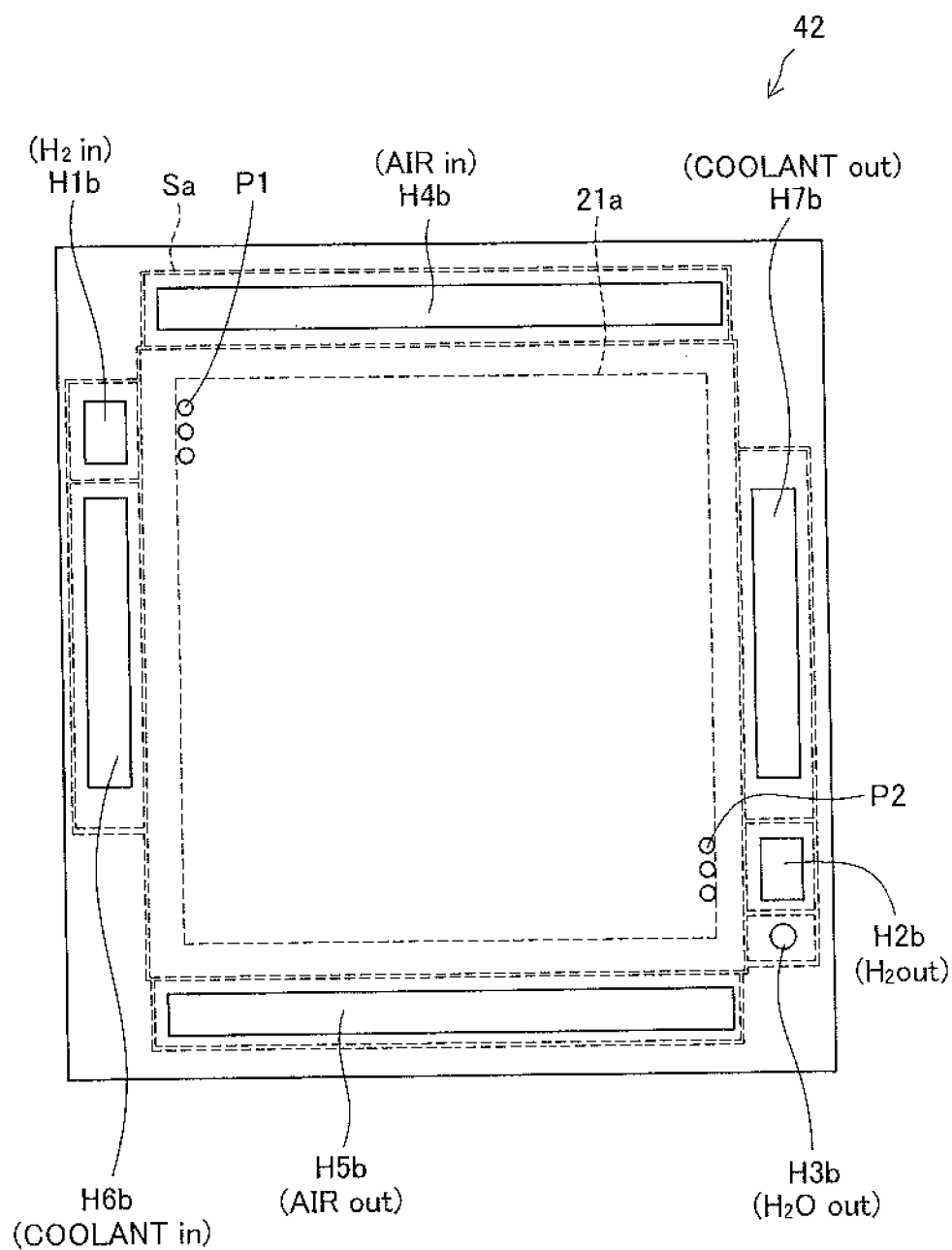
FIG. 4 is an explanatory diagram showing the structure of an anode plate 42.

FIG. 4 is an explanatory diagram showing the structure of the anode plate 42. The broken lines of FIG. 4 indicate a power generation area 21a overlapping the power generation assembly 21 of the seal-integrated membrane electrode assembly 60 and contact regions Sa adjoining to the seal lines SL of the seal gasket 62 in the fuel cell stack 100. The anode plate 42 has an approximate rectangular profile that is substantially equal to the profile of the seal-integrated membrane electrode assembly 60. The anode plate 42 has through holes H1b to H7b. The through holes H1b to H7b have substantially the same shapes and substantially the same opening areas as those of the corresponding through holes H1a to H7a formed in the seal-integrated membrane electrode assembly 60 and form parts of the respective manifolds M1 to M7 in the fuel cell stack 100. The anode plate 42 also has hydrogen gas inlet holes P1 and hydrogen gas outlet holes P2. A plurality of the hydrogen gas inlet holes P1 are formed proximate to the through hole H1b in the power generation area 21a. A plurality of the hydrogen gas outlet holes P2 are formed proximate to the through hole H2b in the power generation area 21a. The hydrogen gas is supplied through the hydrogen gas inlet holes P1 to the anode of the seal-integrated membrane electrode assembly 60, and the hydrogen gas from the anode is discharged through the hydrogen gas outlet holes P2.

Figure 5:
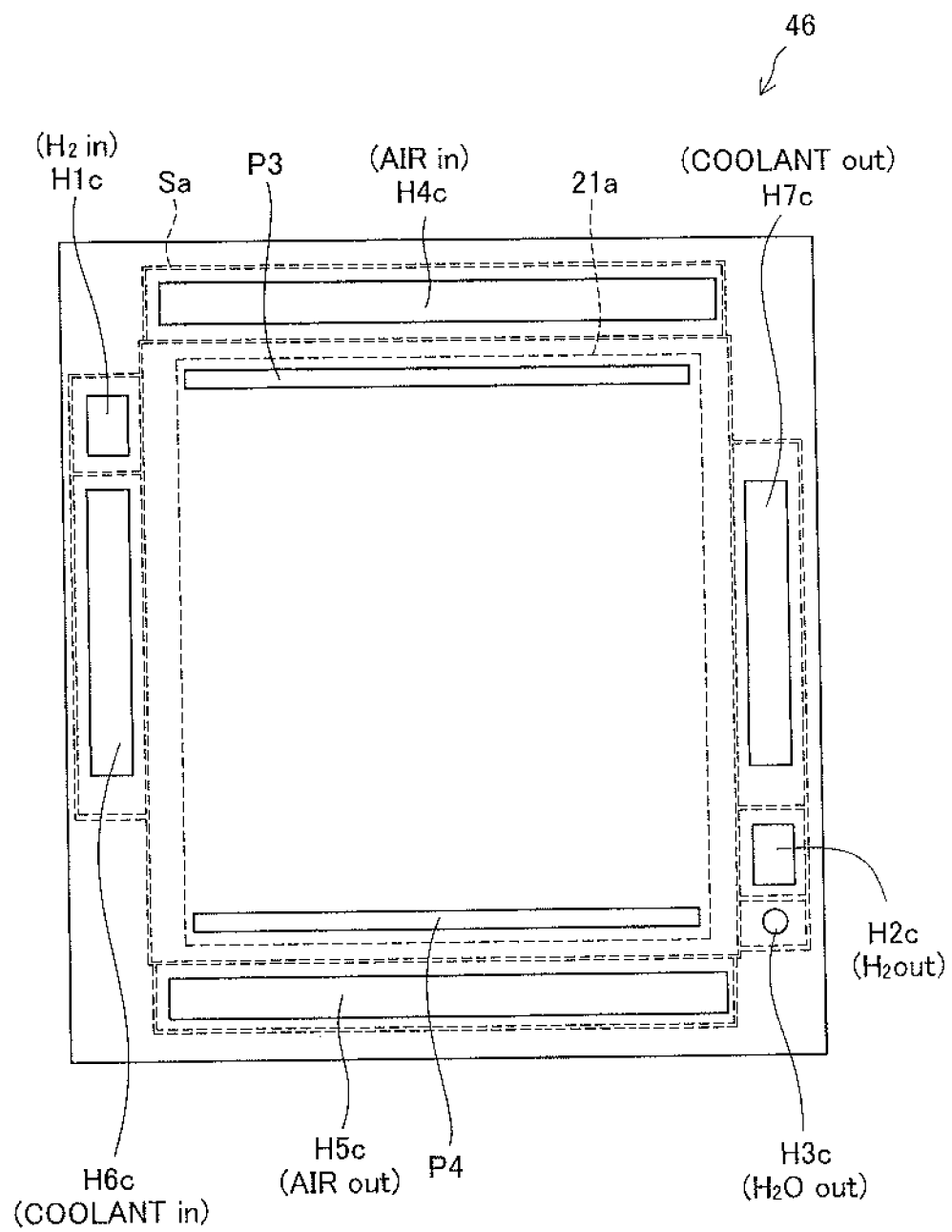
FIG. 5 is an explanatory diagram showing the structure of a cathode plate 46.

FIG. 5 is an explanatory diagram showing the structure of the cathode plate 46. Like FIG. 4, a power generation area 21a and contact regions Sa are indicated by the broken lines in FIG. 5. The cathode plate 46 has an approximate rectangular profile that is substantially equal to the profile of the seal-integrated membrane electrode assembly 60. The cathode plate 46 has through holes H1c to H7c. The through holes H1c to H7c have substantially the same shapes and substantially the same opening areas as those of the corresponding through holes H1a to H7a formed in the seal-integrated membrane electrode assembly 60 and form parts of the respective manifolds M1 to M7 in the fuel cell stack 100. The cathode plate 46 also has an air inlet hole P3 and an air outlet hole P4. The air inlet hole P3 is formed proximate to the through hole H4c in the power generation area 21a. The air outlet hole P4 is formed proximate to the through hole H5c in the power generation area 21a. The air is supplied through the air inlet hole P3 to the cathode of the seal-integrated membrane electrode assembly 60, and the air from the cathode is discharged through the air outlet hole P4.

Figure 6:
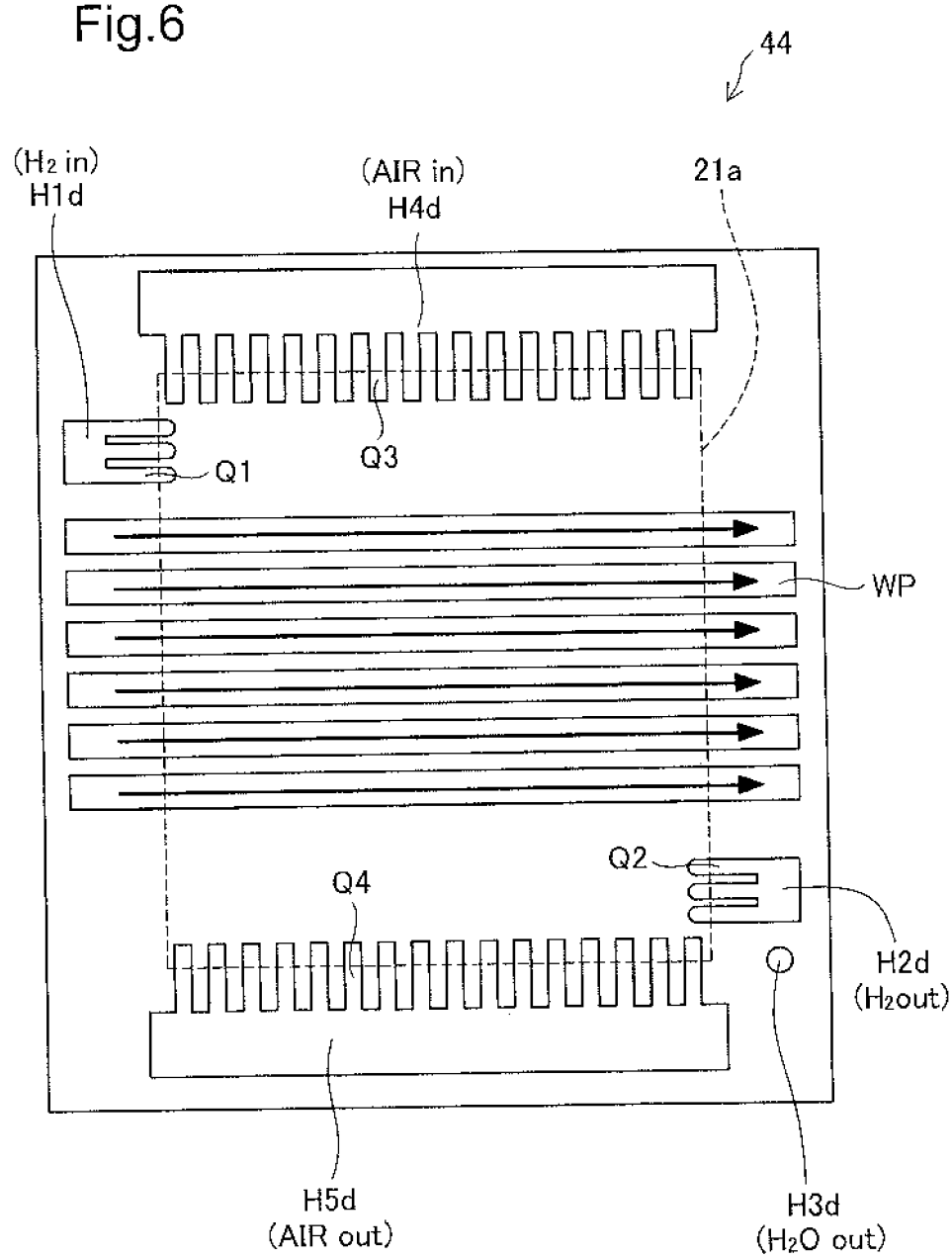
FIG. 6 is an explanatory diagram showing the structure of a middle plate 44.

FIG. 6 is an explanatory diagram showing the structure of the middle plate 44. Like FIGS. 4 and 5, a power generation area 21a is indicated by the broken line in FIG. 6. The middle plate 44 has an approximate rectangular profile that is substantially equal to the profile of the seal-integrated membrane electrode assembly 60. The middle plate 44 has through holes H1d to H5d. The through holes H1d to H5d have substantially the same shapes and substantially the same opening areas as those of the corresponding through holes H1a to H5a formed in the seal-integrated membrane electrode assembly 60 and form parts of the respective manifolds M1 to M5 in the fuel cell stack 100. The middle plate 44 also has connection holes Q1 to Q4. The connection holes Q1 to Q4 respectively have one ends connecting with the through holes H1d to H5d and the other ends connecting with the hydrogen gas inlet hole P1, the hydrogen gas outlet hole P2, the air inlet hole P3 and the air outlet hole P4 in the layered structure of the separator 40. The middle plate 44 further includes a plurality of through holes WP extended right and left. The through holes WP are formed to connect with the through holes H6b, H7b, H6c and H7c formed in the two other plates 42 and 46 when the middle plate 44 is located between the two other plates 42 and 46. The cooling water supplied from outside of the fuel cell stack 100 to the cooling medium supply manifold M6 partly branches off while passing through a through hole H6d in the stacking direction of the laminates 10, and flows across the middle plate 44 to the cooling medium discharge manifold M7 as shown by the arrows of FIG. 6, accompanied with heat evolved by power generation.

Figure 7:
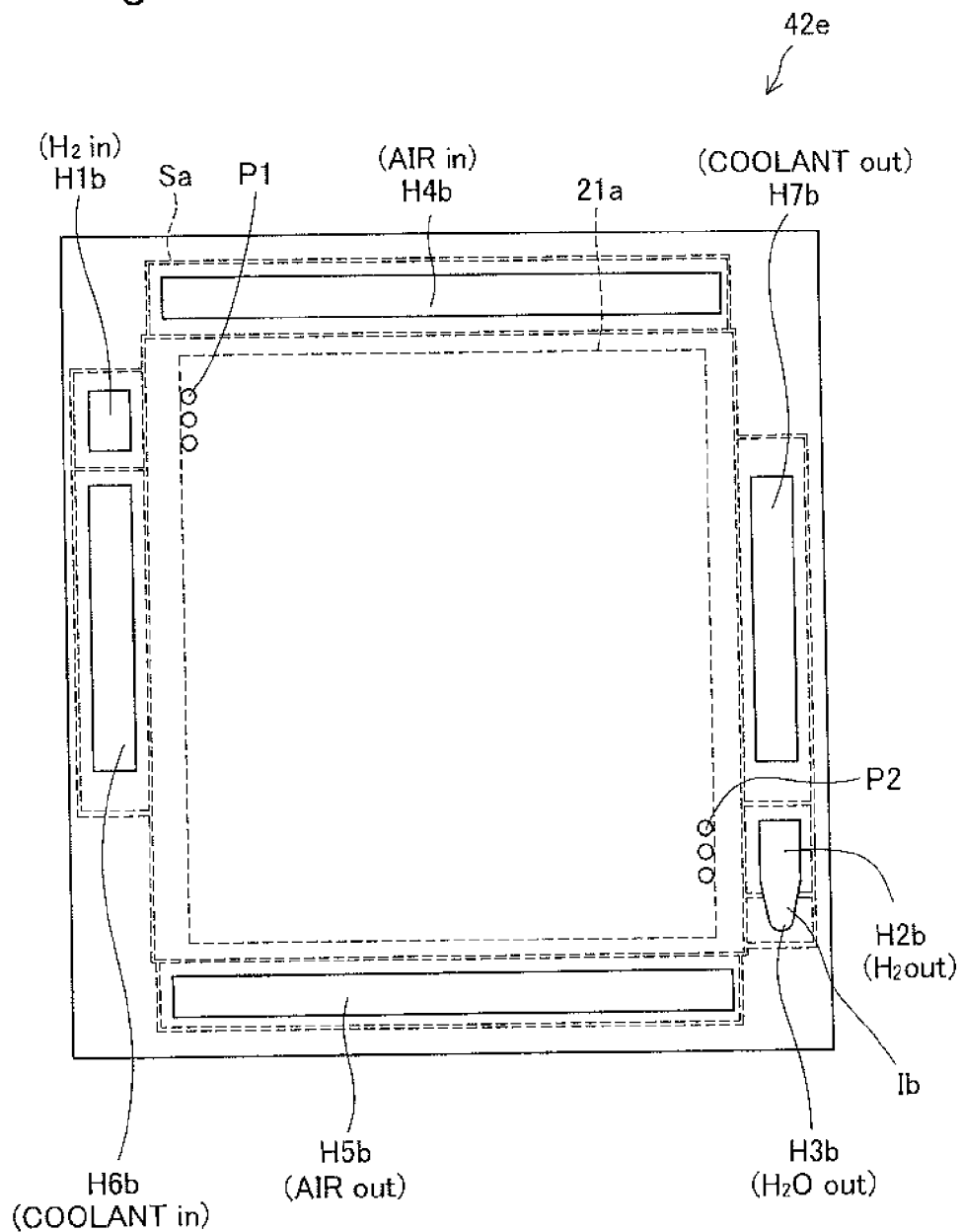
FIG. 7 is an explanatory diagram showing the structure of an anode plate 42e forming part of a connecting section Mco.
Figure 8:
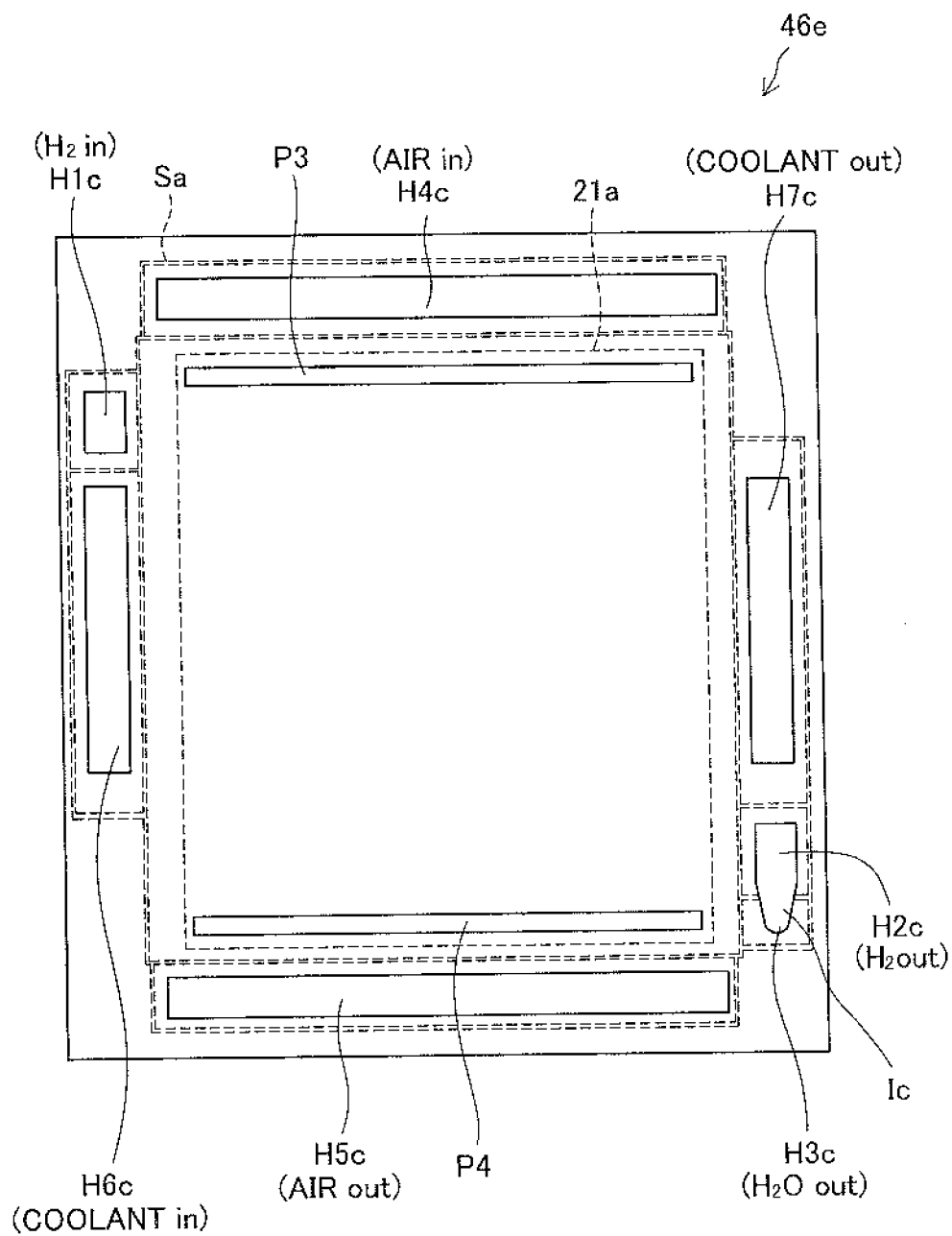
FIG. 8 is an explanatory diagram showing the structure of a cathode plate 46e forming part of the connecting section Mco.
Figure 9:
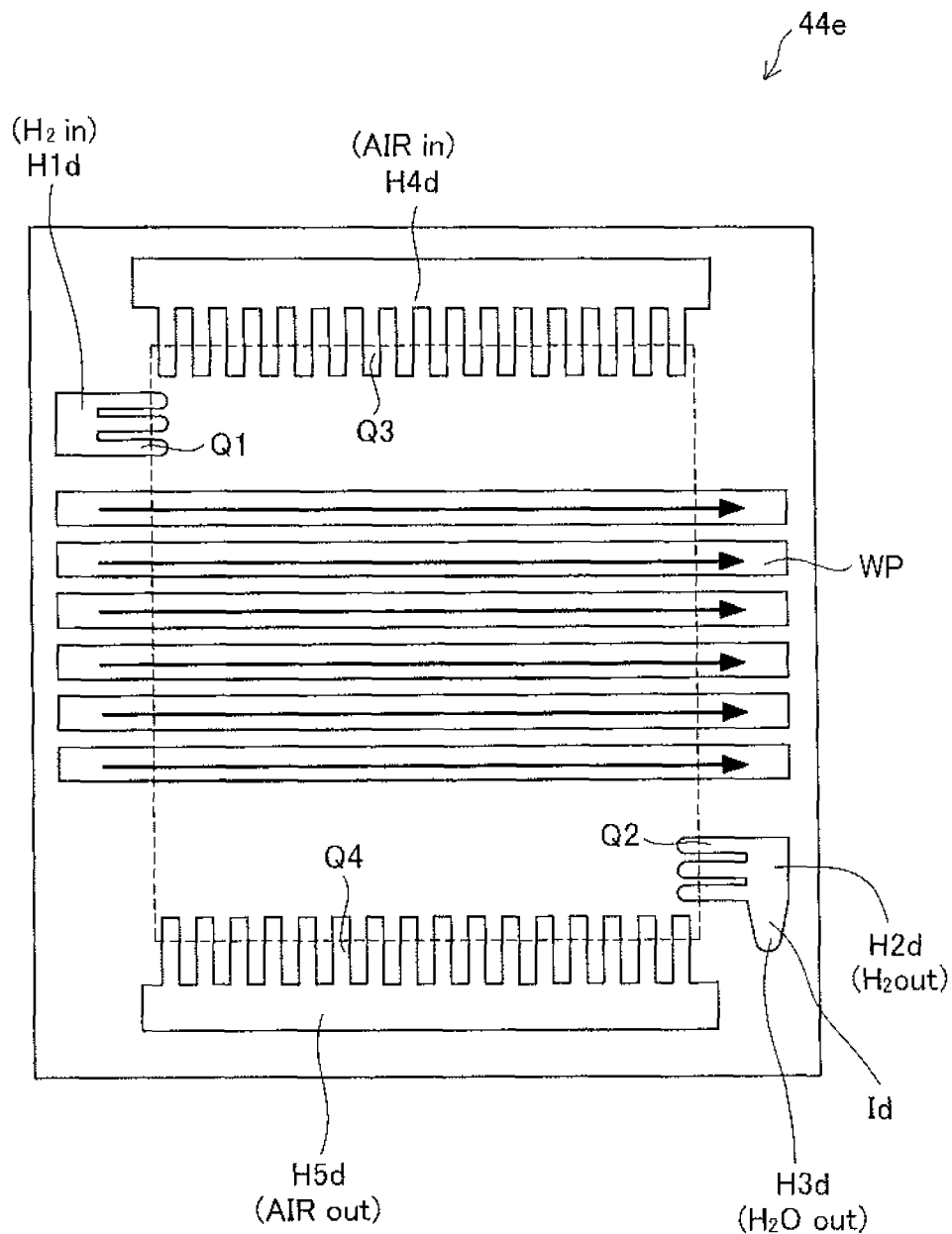
FIG. 9 is an explanatory diagram showing the structure of a middle plate 44e forming part of the connecting section Mco.

FIGS. 7 to 9 are explanatory diagrams showing the structures of plates 42e, 44e and 46e forming the connecting section Mco. The primary difference from the plates 42, 44 and 46 described above is the presence of connection holes 1b, 1c and 1d. The other components of the plates 42e, 44e and 46e are identical with those of the plates 42, 44 and 46 and are thus expressed by the same symbols and are not specifically explained here. The connection hole 1b (FIG. 7) has one end connecting with the through hole H2b and the other end connecting with the through hole H3b. The through hole 1c (FIG. 8) has one end connecting with the through hole H2c and the other end connecting with the through hole H3c. The connection hole 1d (FIG. 9) has one end connecting with the through hole H2d and the other end connecting with the through hole H3d. When the plates 42e, 44e and 46e are stacked, the connection holes 1b, 1c and 1d form the connecting section Mco to interconnect the fuel gas exhaust manifold M2 with the water discharge manifold M3. The separator having the connecting section Mco is referred to as connecting section-forming separator 40e.

Figure 10:
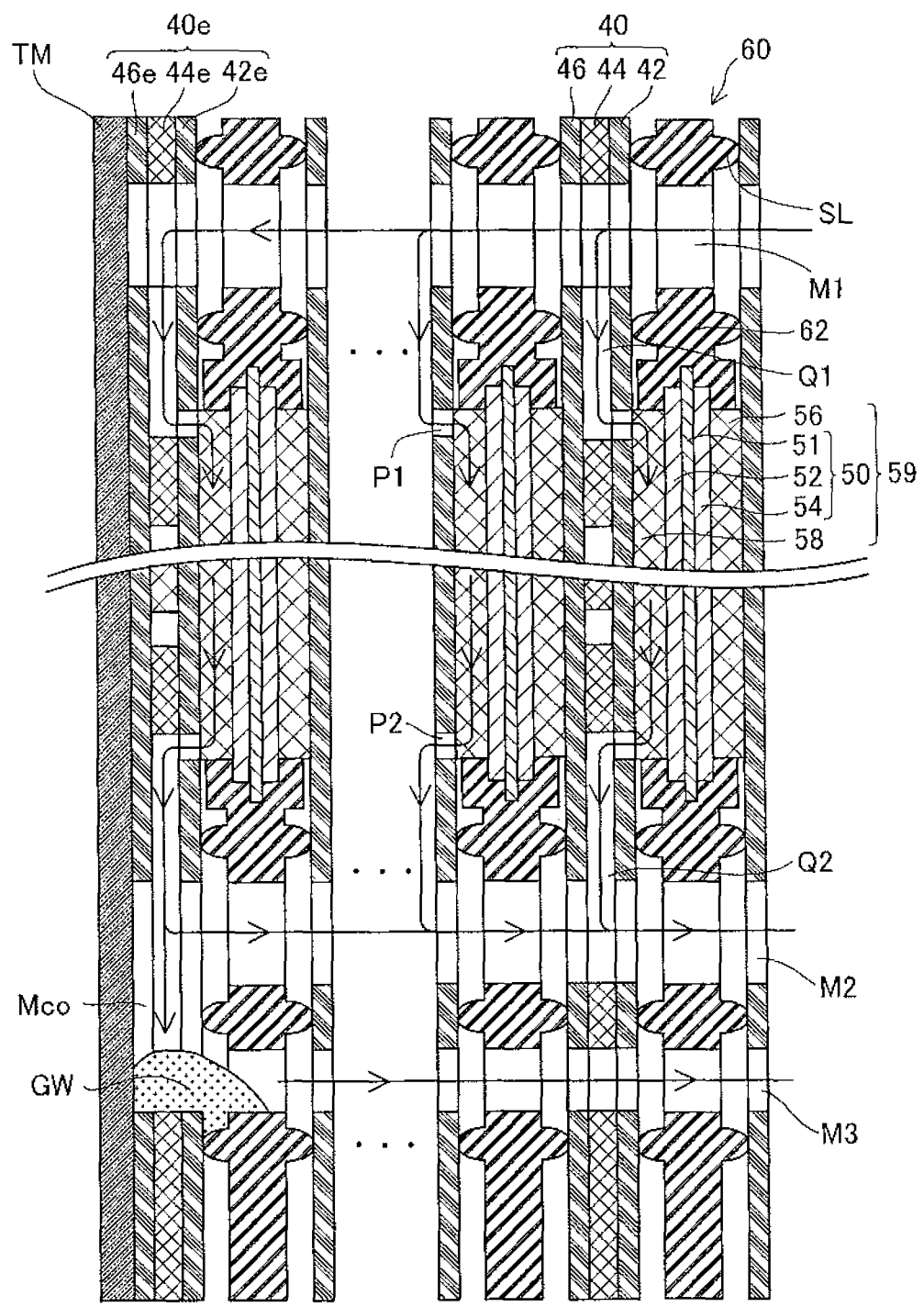
FIG. 10 is a partially sectional view of a fuel cell stack 100.

FIG. 10 is a partial sectional view of the fuel cell stack 100. FIG. 10 shows a cross section corresponding to A-A cross section of FIG. 3, where the seal-integrated membrane electrode assemblies 60 and the separators 40 and 40e are stacked to prepare the fuel cell stack 100. For the convenience of explanation, some parts of the fuel cell stack 100 are omitted from the illustration.

Part of the hydrogen gas supplied to the fuel gas supply manifold M1 flows through the connection hole Q1 and the hydrogen gas inlet hole P1 to the anode gas flow path body 58. The hydrogen gas discharged from the anode flows through the hydrogen gas outlet hole P2 and the connection hole Q2 to the fuel gas exhaust manifold M2 and is released through the fuel gas exhaust pipe 252 (FIG. 1) to the atmosphere. Part of the hydrogen gas discharged from the anode flows through the connecting section Mco into the water discharge manifold M3. Part of the water GW in the fuel gas exhaust manifold M2 also flows through the connecting section Mco into the water discharge manifold M3.

The water discharge manifold M3 is interconected with the fuel gas exhaust manifold M2 via the connecting section Mco, so that part of the water GW in the fuel gas exhaust manifold M2 flows through the connecting section Moo into the water discharge manifold M3. This arrangement reduces the decrease or blockage of the fuel gas exhaust manifold M2 by the water GW. The downstream end R1 of the water discharge manifold M3 is connected with the narrowed flow path 251 (FIG. 1), so that the water GW flowing into the water discharge manifold M3 can be discharged out of the fuel cell stack 100 with high efficiency. More specifically, the structure of this embodiment has only one connecting section Mco, which interconnects the upstream end of the fuel gas exhaust manifold M2 with the upstream end of the water discharge manifold M3. This means that the water discharge flow path consisting of the water discharge manifold M3 and the water discharge pipe 254 is not interconnected with the gas exhaust flow path consisting of the fuel gas exhaust manifold M2 and the fuel gas exhaust pipe 252, except their upstream ends and the narrowed flow path 251. This arrangement lowers the possibility that the flow of water from the upstream side to the downstream side in the water discharge manifold M3 is interfered with by the hydrogen gas discharged from the anode (also called "hydrogen exhaust"). The water in the water discharge manifold M3 can thus be smoothly led to the narrowed flow path 251.

The opening areas of the through holes H3a, H3b, H3c and H3d (FIGS. 3 to 6) are smaller than the opening areas of the through holes H2a, H2b, H2c and H2d. The flow passage area of the water discharge manifold M3 extended through the stack of the respective members 40, 40e and 60 in the stacking direction of the laminates 10 is smaller than the flow passage area of the fuel gas exhaust manifold M2. This arrangement increases the possibility that the flow path of the water discharge manifold M3 is blocked off by the water GW flowing into the water discharge manifold M3. In other words, the water GW in the water discharge manifold M3 tends to form water column. In the case of blocking the flow path of the water discharge manifold M3, a pressure difference between the upstream flow path and the downstream flow path across the water GW enables the water GW to he more smoothly discharged out of the fuel cell stack 100. Especially the structure of this embodiment has only one connecting section Mco to interconnect. the water discharge manifold M3 with the fuel gas exhaust manifold M2 and can thus maintain the constant magnitude relationship between the pressure in the upstream flow path and the pressure in the downstream flow path across the water GW. There is accordingly no inflow of the hydrogen exhaust from the fuel gas exhaust manifold M2 into the flow path of the water discharge manifold M3 located downstream of the water GW, while the water GW flows from the upstream side to the downstream side in the water discharge manifold M3. This arrangement maintains the relationship that the pressure in the downstream flow path is lower than the pressure in the upstream flow path across the water GW and enables the water GW to be smoothly led to the narrowed flow path 251 by means of this pressure difference. For the smooth discharge of the water GW out of the fuel cell stack 100, it is preferable to treat the flow path surfaces of the water discharge manifold M3 and the water discharge pipe 254 to be water repellent. The GW present in the fuel gas exhaust manifold M2 is also introduced to the narrowed flow path 251 through the fuel gas exhaust manifold M2 and is discharged out of the fuel cell stack 100.

B. Second Embodiment

Figure 11:
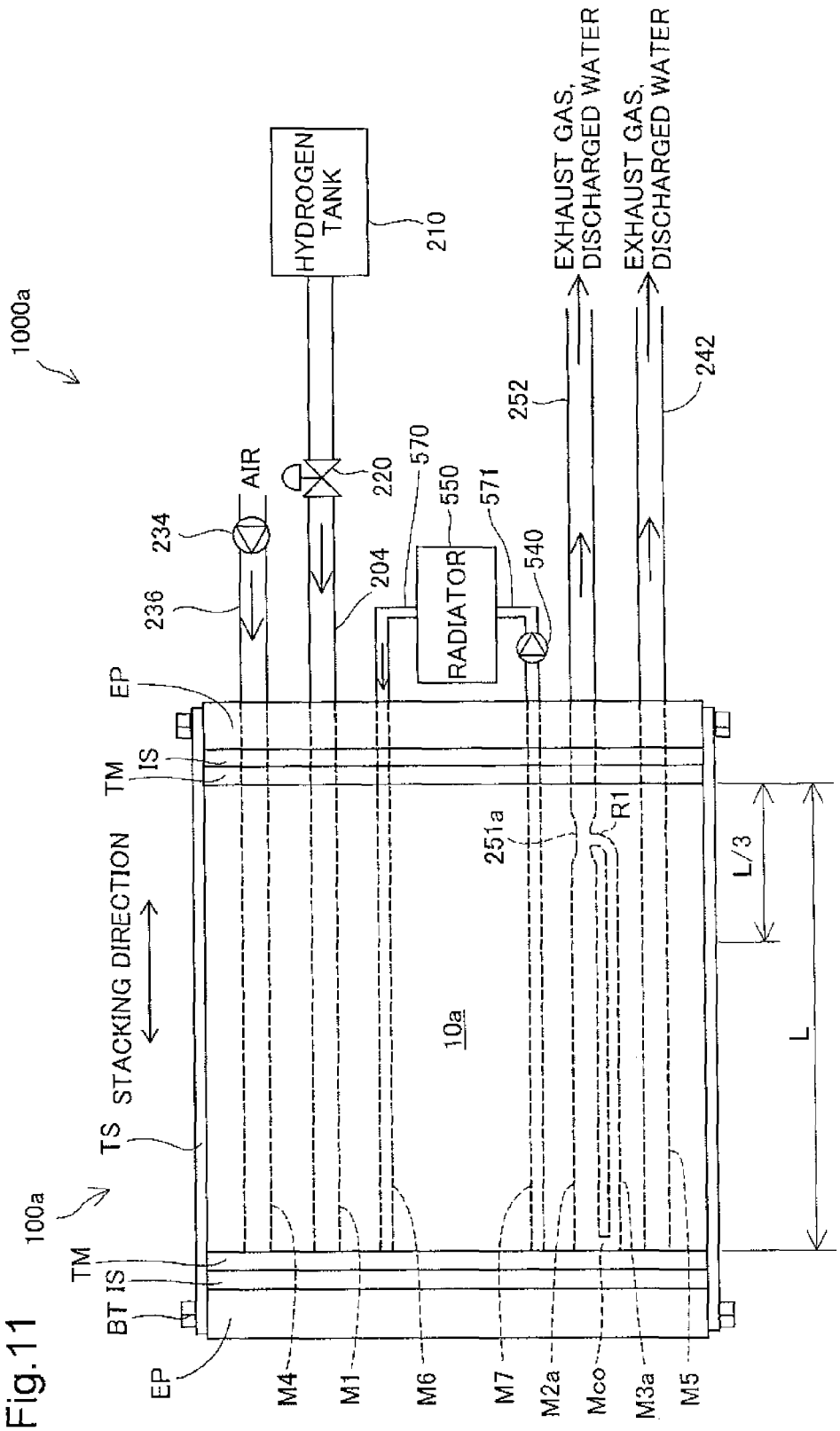
FIG. 11 is an explanatory diagram showing the schematic structure of a fuel cell system 1000a according to a second embodiment of the invention.

FIG. 11 is an explanatory diagram showing the schematic structure of a fuel cell system 1000a according to a second embodiment of the invention. The primary difference from the first embodiment is that a narrowed flow path 251 is formed in the middle of a fuel gas exhaust manifold M2a provided in a fuel cell stack 100a. The structure of the second embodiment does not have the water discharge pipe 254 (FIG. 1), since a downstream end R1 of a water discharge manifold M3a is connected with the narrowed flow path 251a. The other components are identical with those of the first embodiment and are thus expressed by the same symbols and are not specifically explained here. For the convenience of explanation, the vertical lines representing laminates 10a are omitted from the illustration of FIG. 11. The downstream end R1 of the water discharge manifold M3a is formed to have a connection path provided in a separator (discussed later). The water flowing into the water discharge manifold M3a via a connecting section Mco can thus be led downstream of the connecting section Mco with high efficiency. The structure of the second embodiment does not require the water discharge pipe 254 and thus achieves cost reduction. The location of the narrowed flow path 251a is not specifically limited as long as it is downstream of the connecting section Mco. On the assumption that the laminate 10a has a length L in the stacking direction, it is preferable to locate the narrowed flow path 251a within the range of L/3 from a downstream end of the fuel gas exhaust manifold M2a. It is more preferable to locate the narrowed flow path 251a in the range of any of the terminal plate TM, the insulator IS and the end plate EP on the side of the fuel gas exhaust manifold M2a connecting with the fuel gas exhaust pipe 252 (i.e., the downstream side). This arrangement enables the water flowing into the water discharge manifold M3a to be smoothly led out of the fuel cell stack 100a.

Figure 12:
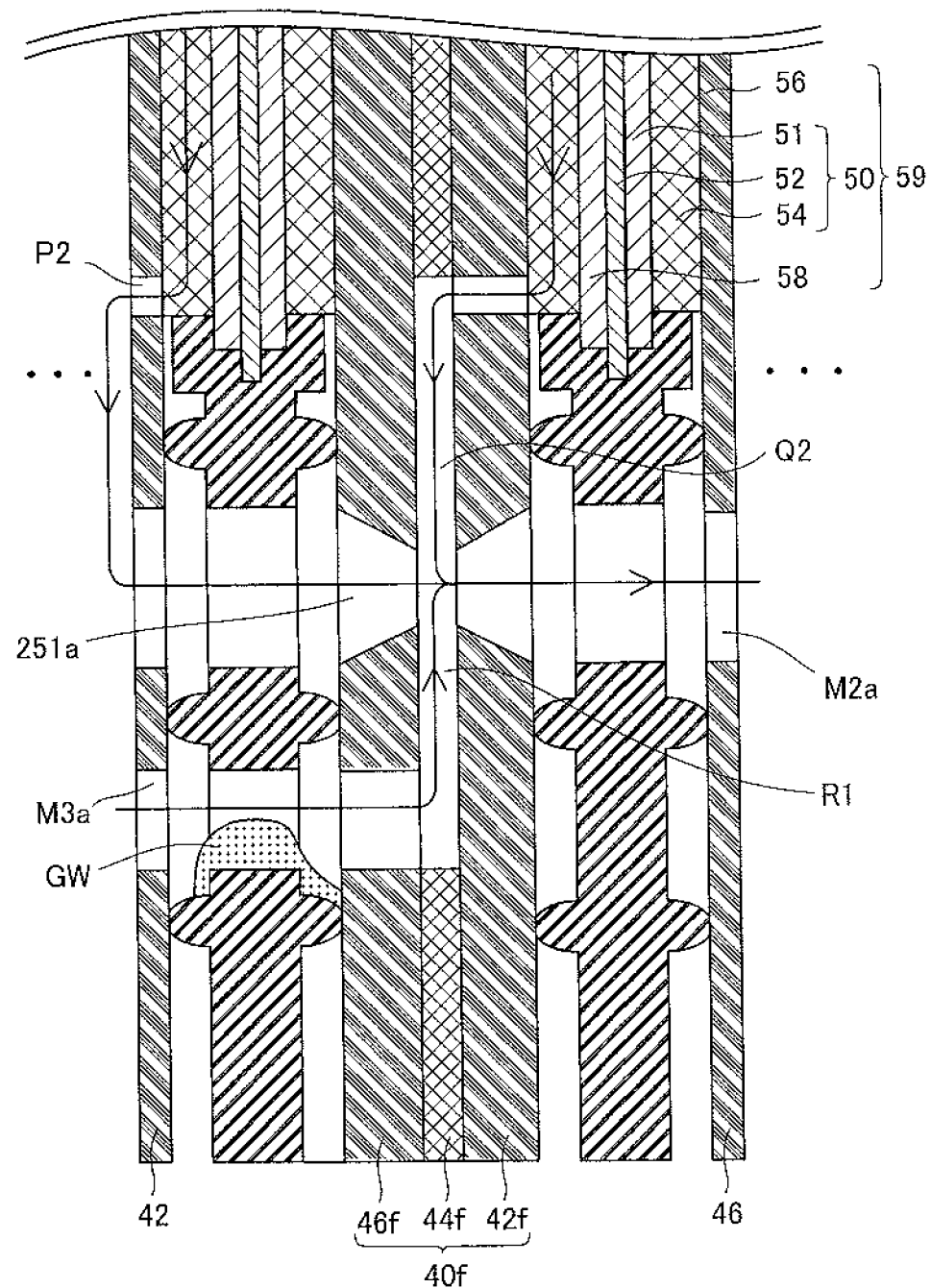

FIG. 12 is a partial sectional view showing the neighborhood of the narrowed flow path 251a. FIG. 12 shows a cross section corresponding to the A-A cross section of FIG. 3 of the first embodiment. A narrowed flow path-forming separator 40f is formed by three metal plates 42f, 44f and 46f having the greater thickness than that of the metal plates of the separator 40. The narrowed flow path-forming separator 40f has the narrowed flow path 251a and the connection path R1. The anode plate 42f of the narrowed flow path-forming separator 40f does not include a through hole forming part of the water discharge manifold M3a, in order to define one end of the water discharge manifold M3a. The pressure of hydrogen gas in the narrowed flow path 251a is lowered than in the adjacent fuel gas exhaust manifold M2a. This arrangement increases the flow rate of hydrogen gas flowing in the water discharge manifold M3a toward the connection with the narrowed flow path 251a and enables the water GW in the water discharge manifold M3a to be led downstream by the flow of hydrogen gas. The narrowed flow path-forming separator 40f consists of the plates having the greater thickness than that of the plates 42, 44 and 46 of the separator 40. This is, however, not restrictive. For example, the narrowed flow path-forming separator 40f may consist of plates having the same thickness than that of the plates of the separator 40. In another embodiment, one of the plates 42f, 44f and 46f may have the greater thickness than that of the corresponding one of the plates 42, 44 and 46 of the separator 40.

Figure 13:
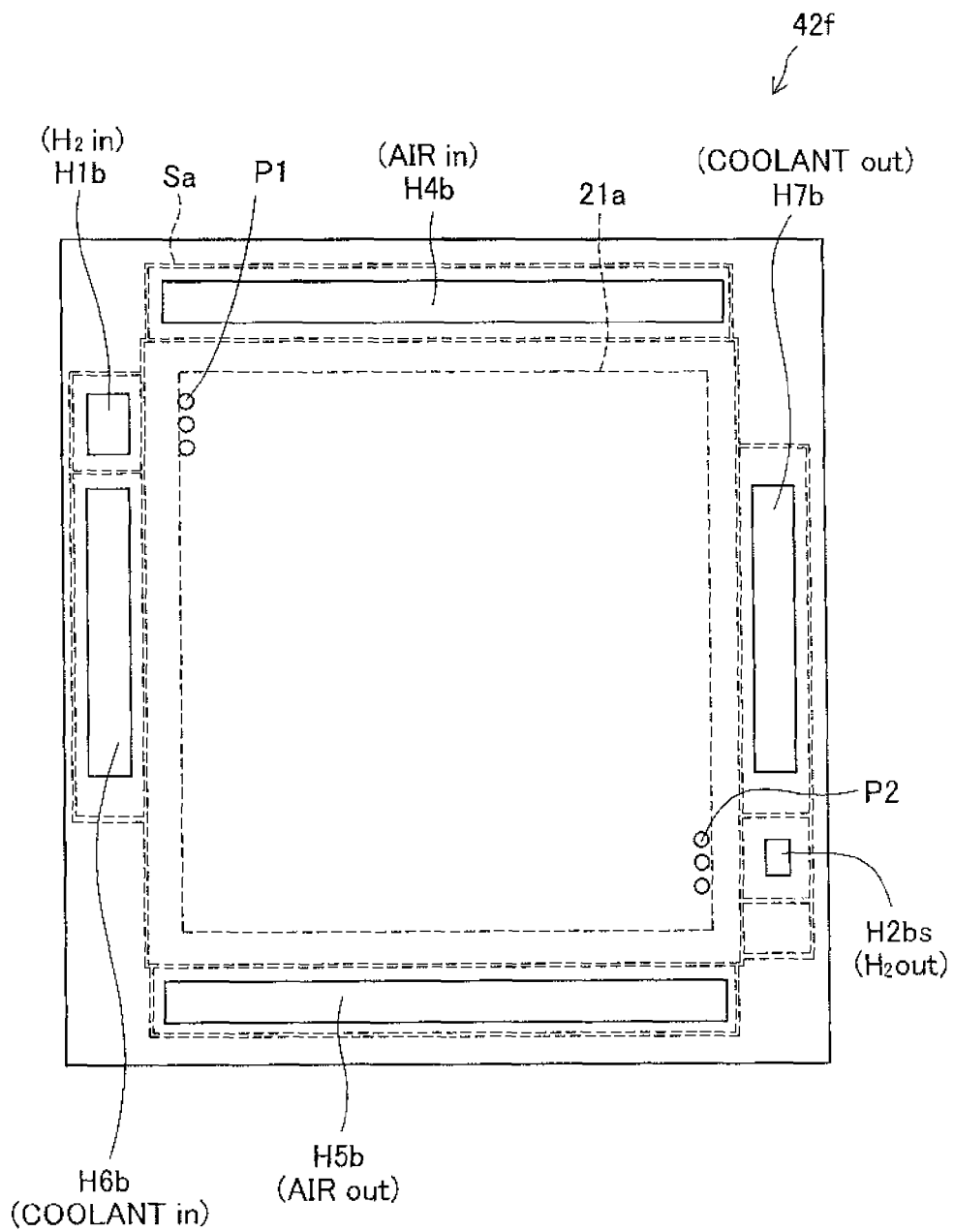
FIG. 13 is an explanatory diagram showing the structure of an anode plate 42f.

FIG. 13 is an explanatory diagram showing the structure of the anode plate 42f. FIG. 13 shows a face adjacent to the middle plate 44f. The opening area of a through hole H2bs (more specifically the opening area of the through hole H2bs on the face adjacent to the middle plate 44f) is made smaller than the opening area of the through hole H2b of the anode plate 42 (FIG. 4), in order to form the narrowed flow path 251a when the three plates 42f, 44f and 46f are stacked. As shown in FIG. 12, the through hole H2bs is tapered in the thickness direction. The anode plate 42f does not include the through hole H3b (FIG. 4) that allows for water passage, in order to define one end of the water discharge manifold M3a. The other components of the anode plate 42f are identical with those of the anode plate 42 and are thus expressed by the same symbols and are not specifically explained here.

Figure 14:
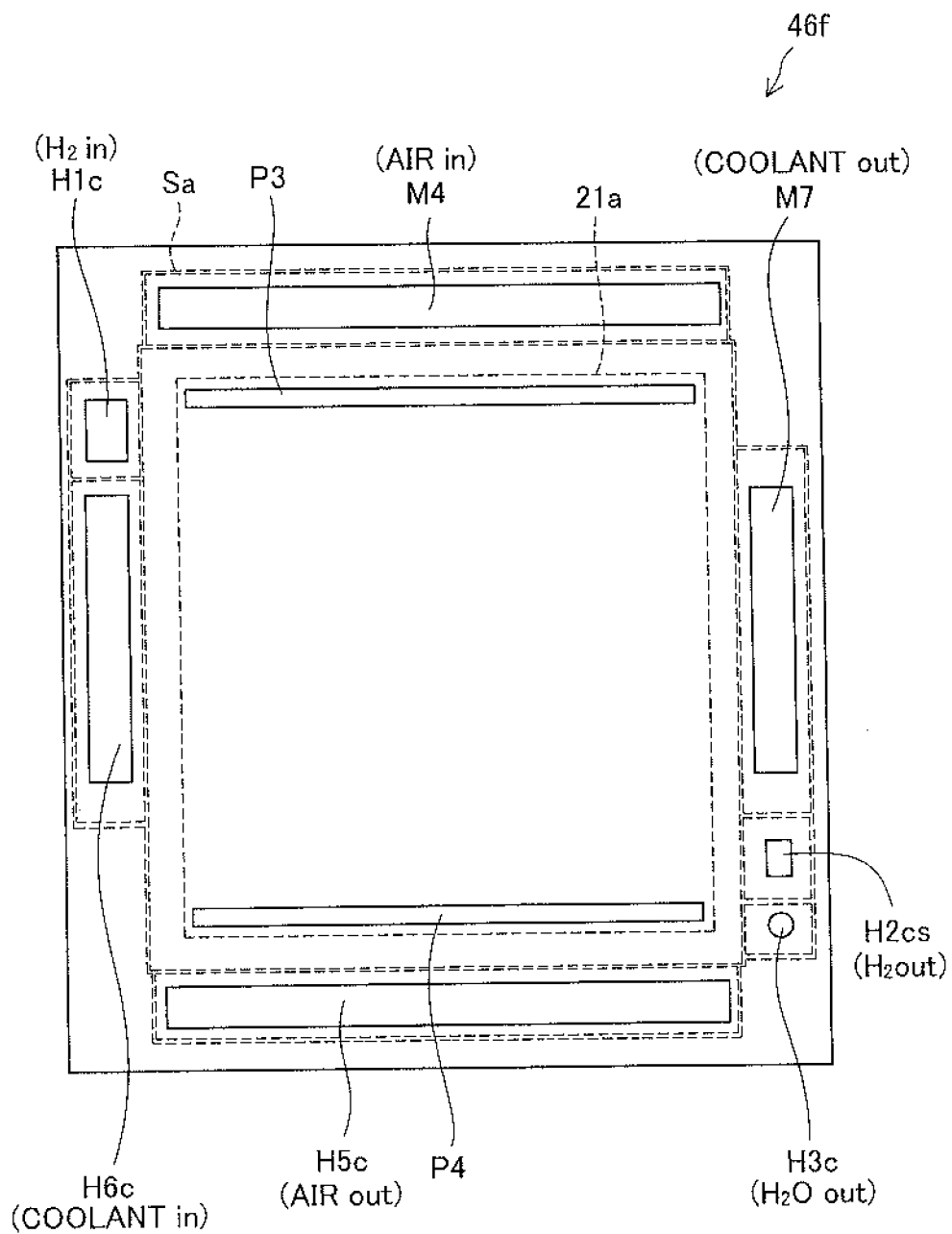
FIG. 14 is an explanatory diagram showing the structure of a cathode plate 46f.

FIG. 14 is an explanatory diagram showing the structure of the cathode plate 46f. FIG. 14 shows a face adjacent to the middle plate 44f. The opening area of a through hole H2cs (more specifically, the opening area of the through hole H2cs on the face adjacent to the middle plate 44f) is made smaller than the opening area of the through hole H2c of the anode plate 46 (FIG. 5). As shown in FIG. 12, the through hole H2cs is tapered in the thickness direction. The other components of the cathode plate 46f are identical with those of the cathode plate 46 and are thus expressed by the same symbols and are not specifically explained here.

Figure 15:
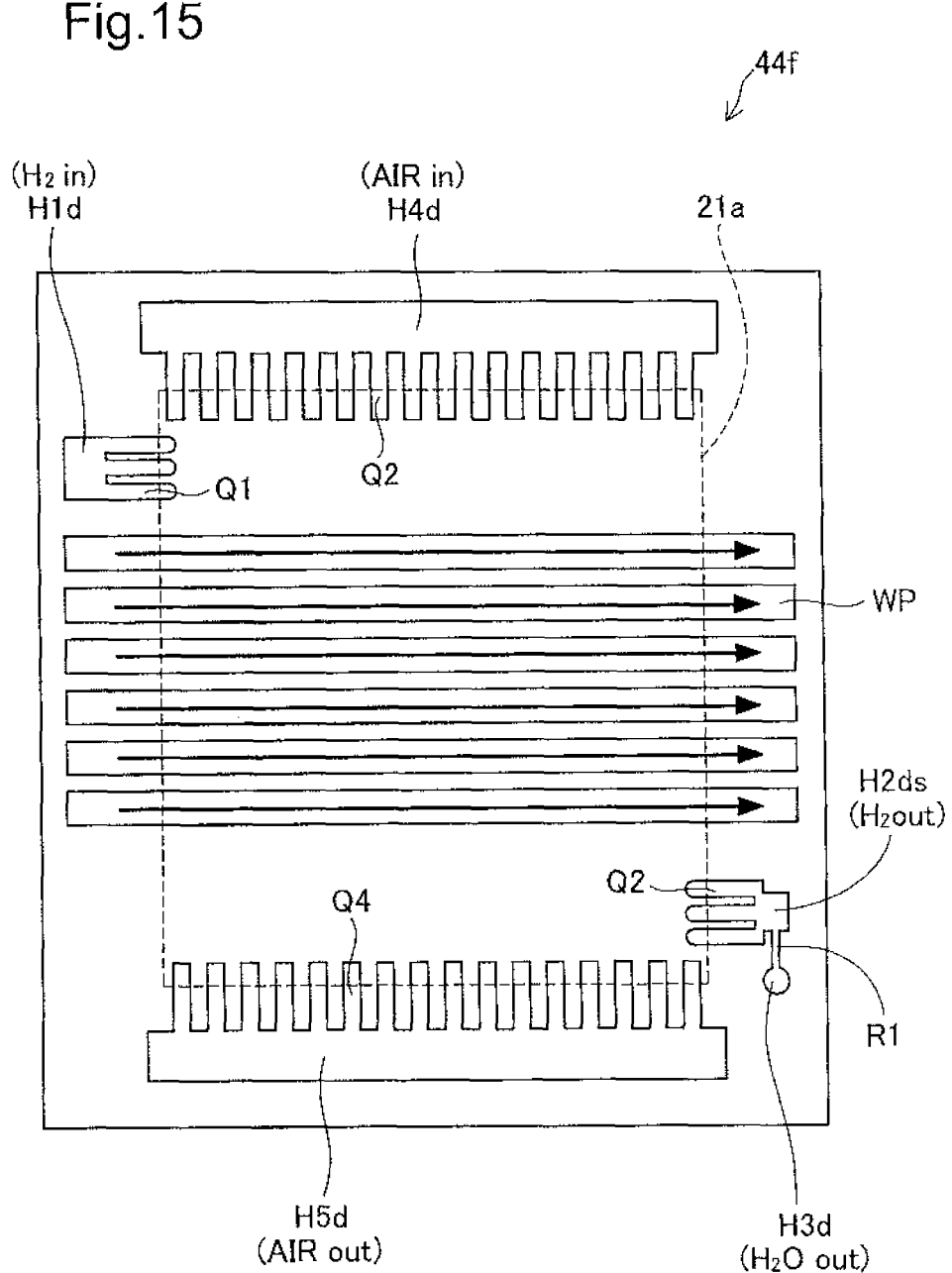
FIG. 15 is an explanatory diagram showing the structure of a middle plate 44f.

FIG. 15 is an explanatory diagram showing the structure of the middle plate 44f. The opening area of a through hole H2ds is made smaller than the opening area of the through hole H2d of the middle plate 44 (FIG. 6). The middle plate 44f also has the connection path R1 that connects a through hole H3d forming part of the water discharge manifold M3a with the through hole H2d forming part of the fuel gas exhaust manifold M2a (i.e., the downstream end R1 of the water discharge manifold M3a). The other components of the middle plate 44f are identical with those of the middle plate 44 and are thus expressed by the same symbols and are not specifically explained here.

The through holes H2bs, H2cs and H2ds are formed at substantially the same positions in the respective plates 42f, 44f and 46f to be aligned and form the narrowed flow path 251a, when the plates 42f, 44f and 46f are stacked. The narrowed flow path 251a and the connection path R1 on the downstream end of the water discharge manifold M3a are readily formed by simply stacking the plates 42f, 44f and 46f. Like the structure of the first embodiment, the structure of the second embodiment enables part of the water GW present in the fuel gas exhaust manifold M2 to flow into the water discharge manifold M3a. This arrangement reduces the decrease or blockage of the fuel gas exhaust manifold M2 by the water GW. Like the structure of the first embodiment, the structure of the second embodiment moves the water GW from the water discharge manifold M3a to the narrowed flow path 251a and enables the water GW led to the narrowed flow path 251a to be discharged out of the fuel cell stack 100a.

C. Third Embodiment

Figure 16:
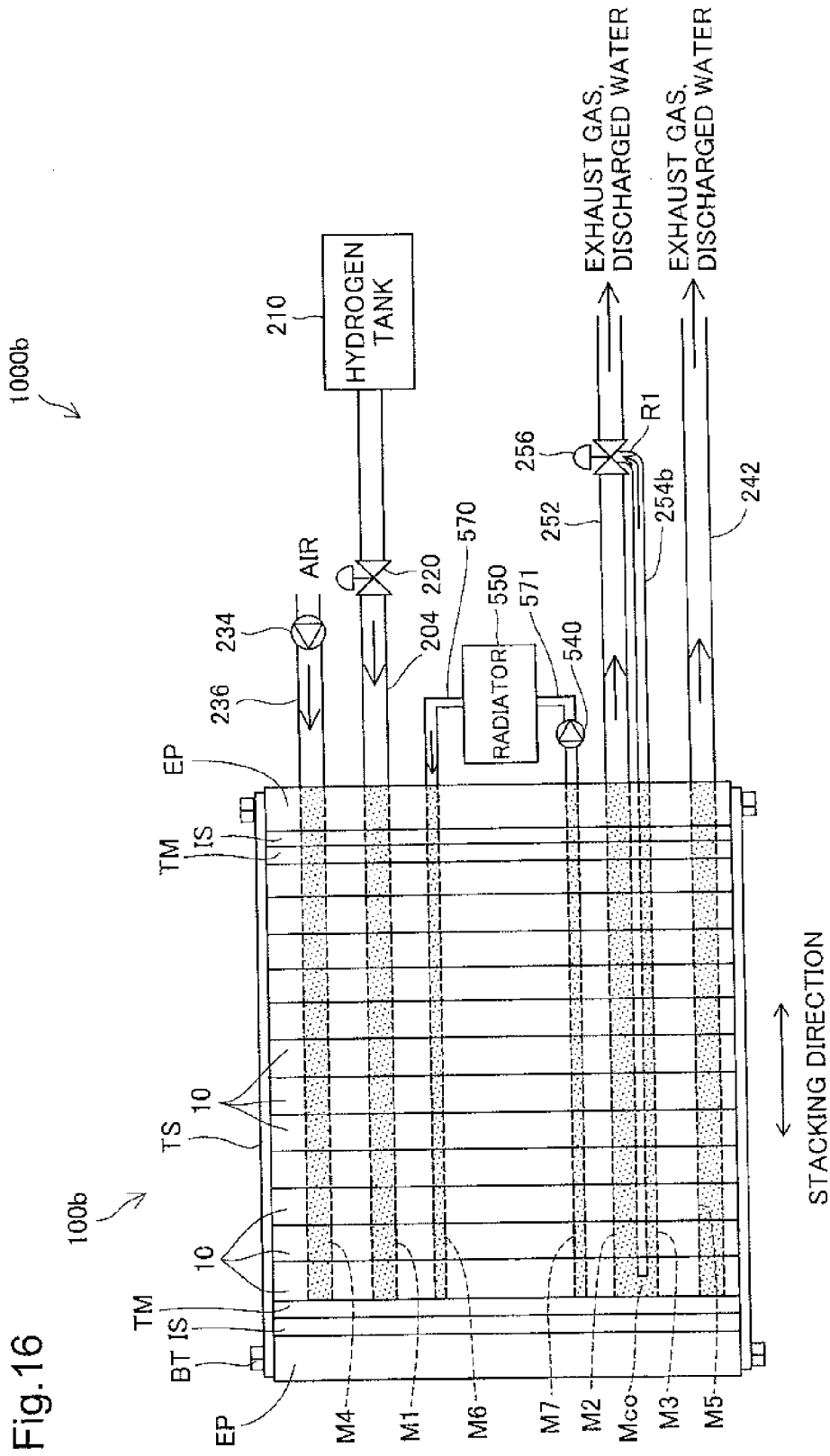
FIG. 16 is an explanatory diagram showing the schematic structure of a fuel cell system 1000b according to a third embodiment of the invention.

FIG. 16 is an explanatory diagram showing the schematic structure of a fuel cell system 1000b according to a third embodiment of the invention. The primary difference from the first embodiment is that the narrowed flow path is implemented by a valve 256 to allow for variable flow passage area. The other components are identical with those of the first embodiment and are thus expressed by the same symbols and are not specifically explained here. A downstream end R1 of a water discharge pipe 254b is connected with the valve 256.

Figure 17:
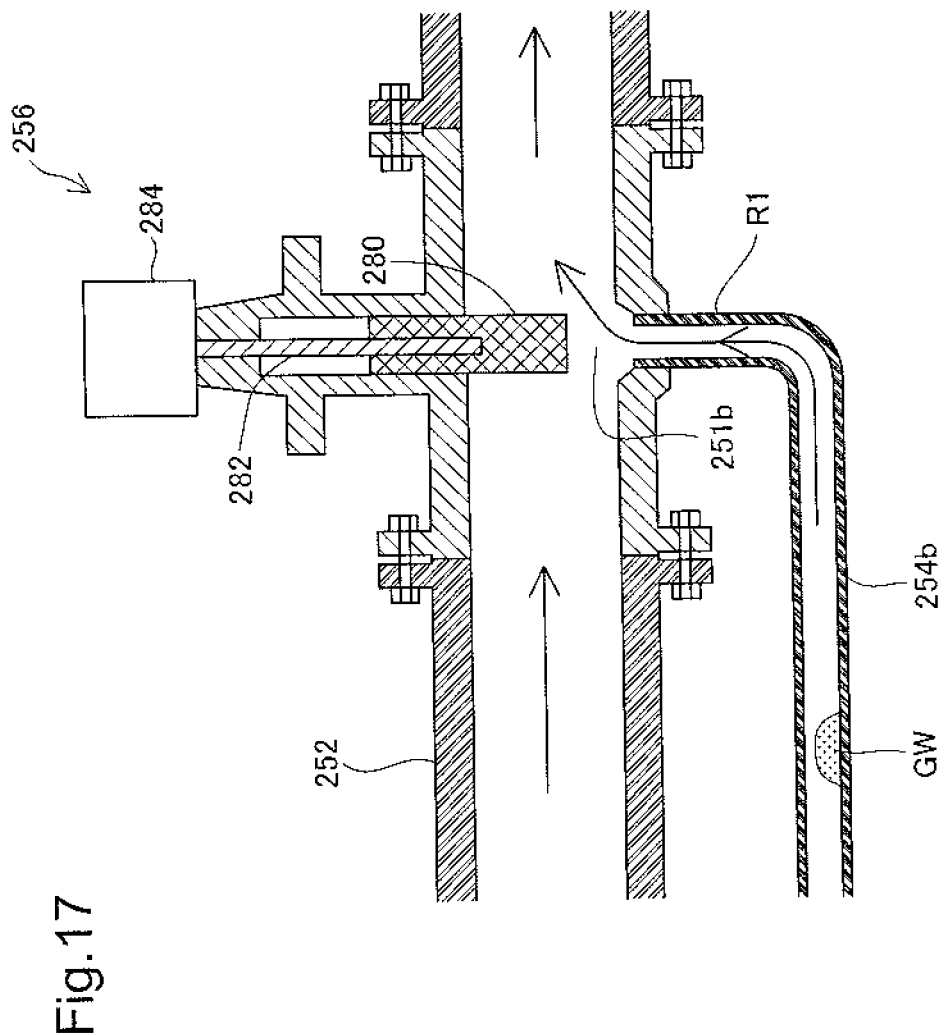
FIG. 17 is an explanatory diagram showing the neighborhood of a valve 256.

FIG. 17 is an explanatory diagram showing the neighborhood of the valve 256. The valve 256 is structured as a gate valve and includes a valve element 280, a valve shaft 282 and a drive mechanism 284 for moving the valve element 280 and the valve shaft 282. The valve element 280 moves orthogonally (vertically) relative to the hydrogen gas flow path via the valve shaft 282 to vary the flow passage area. The downstream end R1 of the water discharge pipe 254b is connected with an opening-closing section of the valve element 280. The flow passage area at the position where the valve element 280 is located, is made smaller than the adjacent flow passage area by opening and closing the valve element 280, so as to readily form a narrowed flow path 251b. The water GW flowing into the water discharge manifold M3 can thus be smoothly led to the downstream of the hydrogen gas and discharged out of the fuel cell stack 100b. Like the structure of the first embodiment, the structure of the third embodiment reduces the decrease or blockage of the fuel gas exhaust manifold M2 by the water GW.

D. Fourth Embodiment

Figure 18:
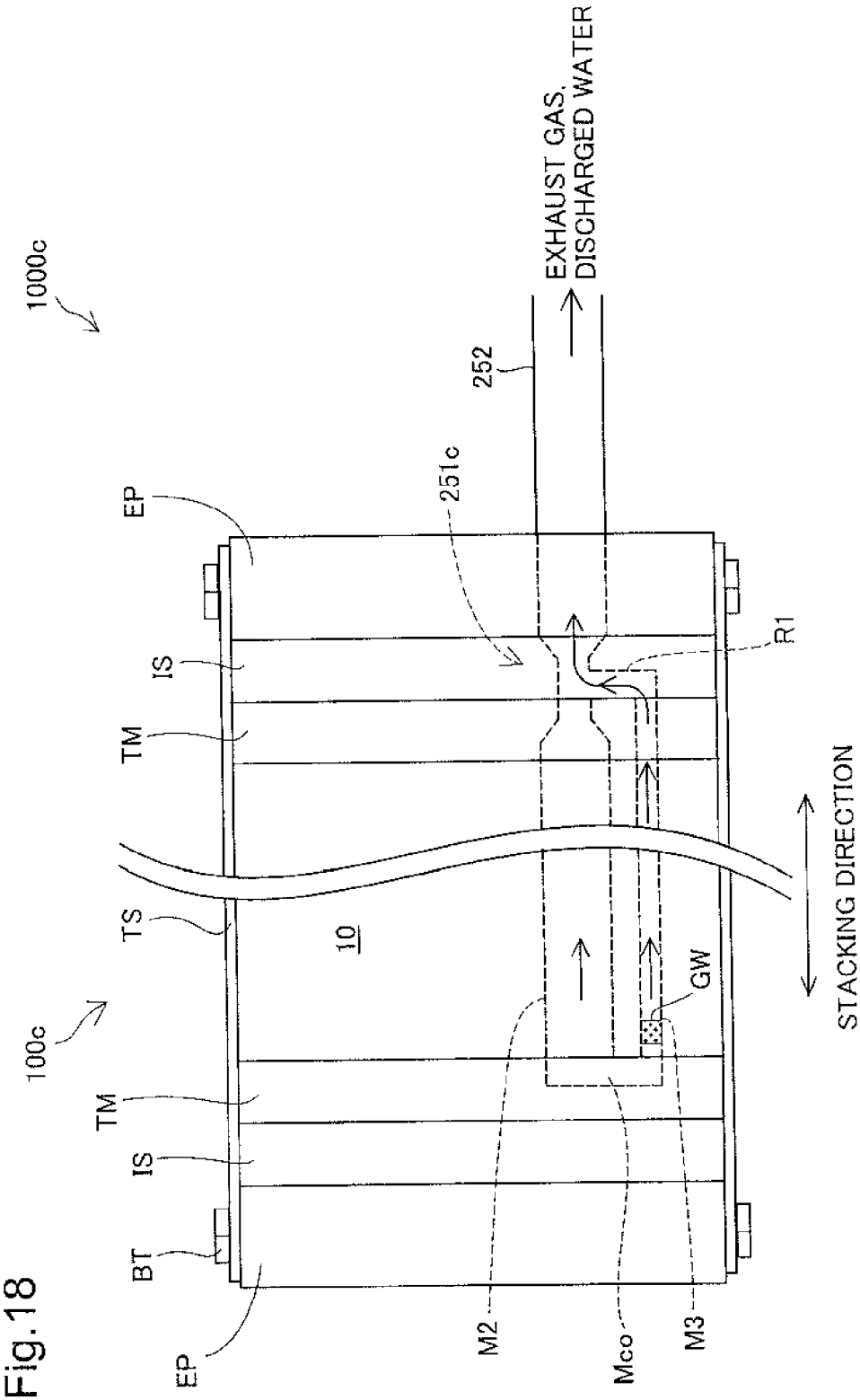
FIG. 18 is an explanatory diagram showing the schematic structure of a fuel cell system 1000c according to a fourth embodiment of the invention.

FIG. 18 is an explanatory diagram showing the schematic structure of a fuel cell system 1000c according to a fourth embodiment of the invention. The primary differences from the first embodiment are the position of a narrowed flow path 251c and the position of a connecting section Mco. Like the structure of the second embodiment, the structure of the fourth embodiment does not have the water discharge pipe 254 (FIG. 1), which is included in the fuel cell system 1000 of the first embodiment. The other components are identical with those of the first embodiment and are thus expressed by the same symbols and are not specifically explained here. For the better understanding, the components that are not directly related to the explanation (for example, the hydrogen tank 210 and the oxidizing gas supply manifold M4 shown in FIG. 1) are omitted from the illustration of FIG. 18, while the components that are directly related to the explanation (for example, the fuel gas exhaust manifold M2 and the water discharge manifold M3) are mainly illustrated in FIG. 18.

As shown in FIG. 18, the narrowed flow path 251c is formed across a terminal plate TM located on the downstream side (hereafter may be referred to as "downstream terminal plate TM") of the pair of terminal plates TM and an insulator IS located on the downstream side (hereafter may be referred to as "downstream insulator LS") of the pair of insulators IS in the flow direction of the fluid (water and hydrogen gas) flowing in the water discharge manifold M3. The downstream end R1 of the water discharge manifold M3 is connected with the specific part of the narrowed flow path 251c defined by the downstream insulator IS. More specifically, the downstream end R1 of the water discharge flow path M3 is defined by forming a groove in the plate face (surface) of the downstream insulator IS to be extended vertically downward from the narrowed flow path 251c.

The connecting section Mco is formed in a terminal plate TM located on the upstream side (hereafter may be referred to as "upstream terminal plate TM") of the pair of terminal plates TM. More specifically, the connecting section Mco is defined by forming a groove in the plate face (surface) of the upstream terminal TM to interconnect the upstream end of the fuel gas exhaust manifold M2 and the upstream end of the water discharge manifold M3 formed in the laminates 10. It is preferable to determine the dimensions of the connecting section Mco, such that the water GW in the fuel gas exhaust manifold M2 and the water discharge manifold M3 is not introduced into the connecting section Mco by capillarity and is not accumulated in the connecting section Mco. In one preferable example, the water discharge manifold M3 may be formed in a column shape of 3 mm in diameter, while the connecting section Mco may be formed in a quadrangular prism shape having the bottom face, about 3 mm on a side.

In the fuel cell system 1000c of the fourth embodiment, the narrowed flow path 251c is formed in the downstream of the laminates 10 of the fuel cell stack 100c, thereby enabling the water in the water discharge flow path M3 and the fuel gas exhaust manifold M2 to be more smoothly led out of the fuel cell stack 100c. Like the structure of the second embodiment, the structure of the fourth embodiment does not require the water discharge pipe 254 (FIG. 1) and thus achieves cost reduction. A part of the narrowed flow path 251c and the downstream end R1 of the water discharge manifold M3 are provided in the downstream insulator IS made of the glass epoxy resin. This facilitates formation of the part of the narrowed flow path 251c and the downstream end R1. For example, the downstream insulator IS including the part of the narrowed flow path 251c and the downstream end R1 can he readily prepared by injection molding.

Figure 19:
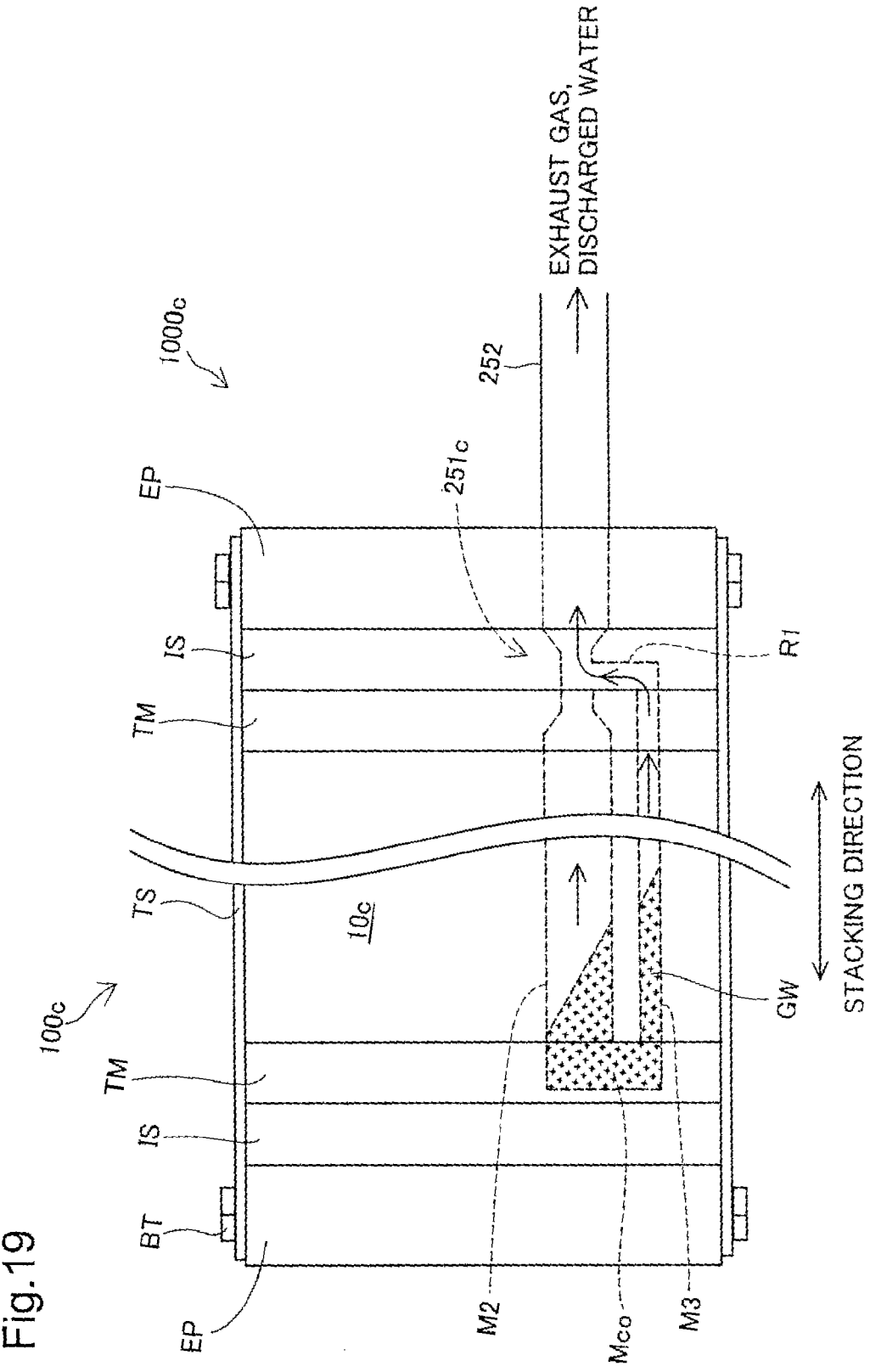
FIG. 19 is a diagram showing a fuel cell stack 100c of FIG. 18 in an inclined state.

FIG. 19 is a diagram showing the fuel cell stack 100c of FIG. 18 in an inclined state. More specifically, in the illustrated state, tilting the vehicle inclines the fuel cell stack 100c mounted on the vehicle, such that the downstream side of the fuel gas exhaust manifold M2 and the water discharge manifold M3 is lower than the upstream side. For the purpose of explanation, the amount of water GW shown in FIG. 19 is greater than that shown in FIG. 18.

The connecting section Mco of this embodiment formed to interconnect the upstream end of the fuel gas exhaust manifold M2 with the upstream end of the water discharge manifold M3 enables the water GW to flow into the water discharge manifold M3 via the connecting section Mco. This decreases the amount of the water GW accumulated in the fuel gas exhaust manifold M2 and reduces the decrease or blockage of the fuel gas exhaust manifold M2. The narrowed flow path 251c has the higher flow rate than the adjacent flow path, so that the pressure in the narrowed flow path 251c is lower than the pressure in the upstream side of the narrowed flow path 251c based on the Bernoulli's theorem. This causes the water GW accumulated in the downstream side of the narrowed flow path 251c in the fuel gas exhaust manifold M2 and in the downstream side of the narrowed flow path 251c in the water discharge manifold M3 to he introduced toward the narrowed flow path 251c. The water GW in the fuel gas exhaust manifold M2 and in the water discharge manifold M3 can thus be smoothly discharged out of the fuel cell stack 100e.

E. Modifications

Among the various components included in the respective embodiments discussed above, those other than the components disclosed in independent claims are additional and supplementary elements and may be omitted according to the requirements. The invention is not limited to any of the embodiments and their applications discussed above but may be actualized in diversity of other embodiments and applications within the scope of the invention. Some examples of possible modification are given below.

E-1. First Modified Example

In the structures of the above embodiments, the water discharge manifold M3 or M3a used as the water discharge flow path for hydrogen exhaust is interconnected with the fuel gas exhaust manifold M2 or M2a via the connecting section Mco. In one modified example, a water discharge manifold for oxidizing gas exhaust may similarly be provided at the position lower than the oxidizing gas exhaust manifold M5 and connected with the oxidizing gas exhaust manifold M5 via a connecting section. In this structure, through holes forming the water discharge manifold may be provided at the lower positions than the respective through holes, e.g., H5a, forming the oxidizing gas exhaust manifold M5 in the respective members (for example, the seal-integrated membrane electrode assembly 60 and the separator 40) of the fuel cell stack 100, 100a or 100b. Another modified example may have two water discharge flow paths (water discharge manifolds), which are respectively connected with the fuel gas exhaust manifold M2 or M2a and with the oxidizing gas exhaust manifold M5. These modified examples reduce the decrease or blockage of the oxidizing gas exhaust manifold M5 by water.

E-2. Second Modified Example and Third Modified Example

Figure 20A:
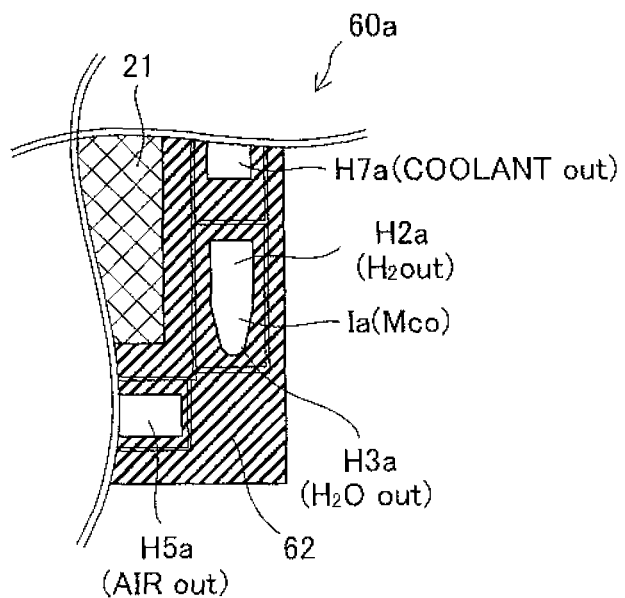
FIGS. 20A and 20B are explanatory diagrams showing a second modified example and a third modified example.
Figure 20B:
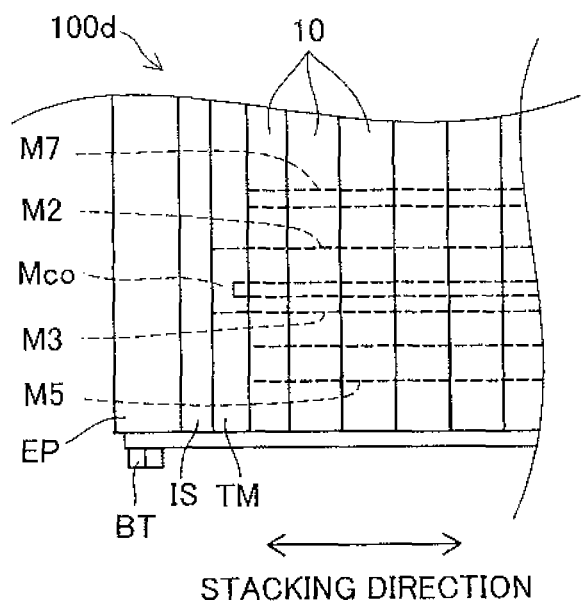

FIGS. 20A and 20B are explanatory diagrams showing a second modified example and a third modified example. FIG. 20A shows the neighborhood of a through hole H2a in a seal-integrated membrane electrode assembly 60a as the second modified example. FIG. 20B shows the neighborhood of a connecting section Mco of a fuel cell stack 100d as the third modified example. In the structures of the first to the third embodiments discussed above, the connecting section Mco is formed by the connection holes 1b, 1c and 1d of the connecting section-forming separator 40e (FIGS. 7 to 9). As shown in FIG. 20A, the connecting section Mco may be formed by a connection hole 1a that is provided in the seal-integrated membrane electrode assembly 60a to interconnect the through holes H2a and H3a. As shown in FIG. 20B, the connecting section Mco may be defined by a hole (groove) formed in the upstream terminal plate TM, like the structure of the fourth embodiment. The hole defining the connecting section Mco may be extended to the insulator IS and the end plate EP.

E-3. Fourth Modified Example

In the structure of the second embodiment discussed above, the narrowed flow path 251a is formed by the narrowed flow path-forming separator 40f (FIG. 11). In the structure of the fourth embodiment discussed above, the narrowed flow path 251a is formed across the downstream terminal plate TM and the downstream insulator IS (FIG. 18). Instead of these structures, the narrowed flow path may be provided in at least one of the terminal plate TM, the insulator IS and the end plate EP on the side of the fuel gas exhaust pipe 252 (FIG. 11) (i.e., on the downstream side), out of the two terminal plates TM, the two insulators IS and the two end plates EP. This arrangement causes the water GW flowing into the water discharge manifold M3a to be led to the narrowed flow path located in the further downstream, thus ensuring the smoother discharge of the water GW out of the fuel cell stack 100a. It is especially preferable to provide the narrowed flow path in the downstream insulator IS. The narrowed flow path is readily formed in the downstream insulator IS, which is made of resin. Resin generally has corrosion resistance to water. Providing the narrowed flow path in the part having corrosion resistance to water, for example, in the downstream insulator IS, enables the shape of the narrowed flow path (flow passage area) to he stably maintained over a long time period. This enables the water present in the fuel gas exhaust manifold M2 and the water discharge manifold M3 to be smoothly moved out of the fuel cell stack.

E-4. Fifth Modified Example

The third embodiment uses the gate valve as the mechanism of varying the flow passage area. Another mechanism, for example, a ball valve, a globe valve, or a variable orifice, may be used for the same purpose.

E-5. Sixth Modified Example

In the above embodiments, the hydrogen gas is released to the atmosphere via the fuel gas exhaust manifold M2 and the fuel gas exhaust pipe 252. In one modified example, the hydrogen gas after removal of water may be circulated to the fuel gas supply manifold M1.

E-6. Seventh Modified Example

The above embodiments describe the fuel cell stacks having such structure that the reaction gases are supplied from the gas supply manifolds M1 and M4 through inside of the separator 40 to the gas flow path bodies 56 and 58 to diffuse the reaction gases over the power generation assembly 21. The separator 40 is, however, not limited to this structure. In one modified example, concaves (grooves) may be formed on the surface of the separator, and the reaction gases may be supplied from the gas supply manifolds M1 and M4 through the concaves to the gas flow path bodies 56 and 58. In a further modified structure without the gas flow path bodies 56 and 58, the reaction gases may be supplied through the concaves formed on the surface of the separator to the power generation assembly 21 (specifically, the electrode layers 52 and 54).

E-7. Eighth Modified Example

In the first, second and fourth embodiments discussed above, the flow passage area of the narrowed flow path 251, 251a or 251e (FIGS. 1, 11 and 18) is formed in the shape that gradually decreases from the flow passage area of the adjacent flow path proximate to the narrowed flow path 251, 251a or 251c (i.e., the venturi shape). The narrowed flow path 251, 251a or 251c is, however, not limited to this shape. The narrowed flow path 251, 251a or 251c may be formed in any shape having the smaller flow passage area than the flow passage area of the adjacent flow path. In one modified example, the flow passage area may be varied stepwise from the adjacent flow path to the narrowed flow path 251, 251a or 251c. This modified structure also enables the narrowed flow path 251, 251a or 251e to have the higher flow rate and thereby the lower pressure than the adjacent flow path. The water GW present in the upstream of the narrowed flow path 251, 251a or 251c can be led through the fuel cell stack and discharged out of the fuel cell stack.

E-8. Ninth Modified Example

The above embodiments describe the fuel cell systems 1000 to 1000c mounted on the vehicle. This is, however, not restrictive. Any of the fuel cell systems 1000 to 1000c according to the invention may be mounted on any of various moving bodies including vehicles and boast and ships to be used as the power source of the moving body. Any of the fuel cell systems 1000 to 1000c may also be used as a stationary power source.

The invention claimed is:

1. A fuel cell system, comprising a fuel cell stack including:
a plurality of laminates of membrane electrode assemblies stacked via separators; and
a pair of end plates holding the plurality of laminates from both sides, wherein
in a stacking direction of the laminates, the fuel cell stack further includes:
a pair of terminal plates respectively located between the plurality of stacked laminates and the pair of end plates; and
a pair of insulators respectively located between the pair of terminal plates and the pair of end plates disposed outside the pair of terminal plates, the fuel cell system further comprising:
a gas exhaust flow path for discharging a reaction gas extended in the stacking direction of the laminates and configured to have one end located inside the fuel cell stack and the other end located outside the fuel cell stack; and
a water discharge flow path provided at a lower position than the gas exhaust flow path in an installation state of the fuel cell stack and formed to pass through at least part of the laminates, wherein
the gas exhaust flow path is interconnected with the water discharge flow path via at least one connecting section in the fuel cell stack,
the gas exhaust flow path includes a narrowed flow path having smaller sectional area than sectional area of an adjacent flow path in downstream of the connecting section, the narrowed flow path being formed in a downstream insulator, wherein in a flow direction of the reaction gas flowing in the water discharge flow path, the downstream insulator is located on a downstream side out of the pair of insulators and made of resin, and
the water discharge flow path has a downstream end connecting with the narrowed flow path.

2. The fuel cell system in accordance with claim 1, wherein in the fuel cell stack, flow passage area of the water discharge flow path is smaller than flow passage area of the gas exhaust flow path.

3. The fuel cell system in accordance with claim 1, wherein the connecting section is formed to interconnect at least an upstream end of the gas exhaust flow path with an upstream end of the water discharge flow path.

4. The fuel cell system in accordance with claim 1, wherein the number of the connecting section is one, and
the connecting section is formed to interconnect an upstream end of the gas exhaust flow path with an upstream end of the water discharge flow path.

5. The fuel cell system in accordance with claim 2, wherein the connecting section is formed to interconnect at least an upstream end of the gas exhaust flow path with an upstream end of the water discharge flow path.

6. The fuel cell system in accordance with claim 2, wherein the number of the connecting section is one, and
the connecting section is formed to interconnect an upstream end of the gas exhaust flow path with an upstream end of the water discharge flow path.

* * * * *